(12) United States Patent
Stickler et al.

(10) Patent No.: US 12,370,775 B2
(45) Date of Patent: Jul. 29, 2025

(54) METHODS OF MANUFACTURING MATERIAL SYSTEMS

(71) Applicant: The Boeing Company, Chicago, IL (US)

(72) Inventors: Patrick Bickford Stickler, Everett, WA (US); Alexander Rubin, St. Louis, MO (US)

(73) Assignee: THE BOEING COMPANY, Arlington, VA (US)

( * ) Notice: Subject to any disclaimer, the term of this patent is extended or adjusted under 35 U.S.C. 154(b) by 86 days.

(21) Appl. No.: 17/360,872

(22) Filed: Jun. 28, 2021

(65) Prior Publication Data
US 2021/0323274 A1    Oct. 21, 2021

Related U.S. Application Data

(62) Division of application No. 15/378,931, filed on Dec. 14, 2016, now Pat. No. 11,077,644.

(51) Int. Cl.
*B32B 15/14* (2006.01)
*B29C 43/56* (2006.01)
(Continued)

(52) U.S. Cl.
CPC .............. *B32B 15/14* (2013.01); *B29C 43/56* (2013.01); *B29C 65/02* (2013.01); *B29C 66/712* (2013.01);
(Continued)

(58) Field of Classification Search
CPC .......... B29C 66/7422; B29C 66/7444; B29C 66/7465; B32B 37/06; B32B 37/10
See application file for complete search history.

(56) References Cited

U.S. PATENT DOCUMENTS

| | | |
|---|---|---|
| 3,341,052 A | 9/1967 | Barthel |
| 3,691,000 A | 9/1972 | Kalnin |
| (Continued) | | |

FOREIGN PATENT DOCUMENTS

| | | |
|---|---|---|
| CN | 103237646 A | 8/2013 |
| CN | 103338925 A | 10/2013 |
| (Continued) | | |

OTHER PUBLICATIONS

Aug. 28, 2018 Office Action in related U.S. Appl. No. 15/378,931.
(Continued)

*Primary Examiner* — Michael A Tolin
*Assistant Examiner* — Hana C Page
(74) *Attorney, Agent, or Firm* — MH2 Technology Law Group LLP

(57) ABSTRACT

A material system may include: an aluminum layer; a glass composite layer adjacent to the first aluminum layer; and a carbon composite layer adjacent to the first glass composite layer, and opposite to the first aluminum layer. A method of manufacturing a material system may include: stacking an aluminum layer, glass composite layer that may include thermoplastic prepreg plies, and carbon composite layer so that the aluminum layer is adjacent to the glass composite layer, and the glass composite layer is adjacent to the carbon composite layer; and consolidating the thermoplastic prepreg plies to soften the aluminum layer. A method of manufacturing a material system may include: stacking an aluminum layer, glass composite layer that comprises thermoplastic resin, and carbon composite layer so that the glass composite layer is between the aluminum and carbon composite layers; and adjusting temperature and pressure to consolidate the stack.

20 Claims, 17 Drawing Sheets

(51) Int. Cl.

| | |
|---|---|
| *B29C 65/00* | (2006.01) |
| *B29C 65/02* | (2006.01) |
| *B29C 70/88* | (2006.01) |
| *B32B 5/02* | (2006.01) |
| *B32B 5/14* | (2006.01) |
| *B32B 5/26* | (2006.01) |
| *B32B 7/10* | (2006.01) |
| *B32B 15/04* | (2006.01) |
| *B32B 15/20* | (2006.01) |
| *B32B 27/28* | (2006.01) |
| *B32B 37/06* | (2006.01) |
| *B32B 37/10* | (2006.01) |
| *B29K 71/00* | (2006.01) |
| *B29K 105/00* | (2006.01) |
| *B29K 105/08* | (2006.01) |
| *B29K 105/12* | (2006.01) |
| *B29K 305/02* | (2006.01) |
| *B29K 307/04* | (2006.01) |
| *B29K 309/08* | (2006.01) |
| *B29K 705/02* | (2006.01) |
| *B29L 9/00* | (2006.01) |

(52) U.S. Cl.
CPC ...... *B29C 66/7212* (2013.01); *B29C 66/7392* (2013.01); *B29C 66/7422* (2013.01); *B29C 66/7444* (2013.01); *B29C 70/885* (2013.01); *B32B 5/024* (2013.01); *B32B 5/14* (2013.01); *B32B 5/26* (2013.01); *B32B 7/10* (2013.01); *B32B 15/043* (2013.01); *B32B 15/20* (2013.01); *B32B 27/288* (2013.01); *B32B 37/06* (2013.01); *B32B 37/10* (2013.01); *B29C 2043/561* (2013.01); *B29C 66/7465* (2013.01); *B29K 2071/00* (2013.01); *B29K 2105/0872* (2013.01); *B29K 2105/12* (2013.01); *B29K 2105/253* (2013.01); *B29K 2305/02* (2013.01); *B29K 2307/04* (2013.01); *B29K 2309/08* (2013.01); *B29K 2705/02* (2013.01); *B29K 2995/0078* (2013.01); *B29L 2009/003* (2013.01); *B32B 2260/021* (2013.01); *B32B 2260/023* (2013.01); *B32B 2260/046* (2013.01); *B32B 2262/101* (2013.01); *B32B 2262/106* (2013.01); *B32B 2305/076* (2013.01); *B32B 2311/24* (2013.01); *B32B 2313/04* (2013.01); *B32B 2315/08* (2013.01); *B32B 2605/08* (2013.01); *B32B 2605/10* (2013.01); *B32B 2605/18* (2013.01)

(56) References Cited

U.S. PATENT DOCUMENTS

| | | | |
|---|---|---|---|
| 4,532,169 A | 7/1985 | Carley | |
| 4,820,568 A | 4/1989 | Harpell et al. | |
| 4,867,091 A | 9/1989 | Arisato et al. | |
| 5,039,571 A | 8/1991 | Vogelesang et al. | |
| 5,066,536 A | 11/1991 | Cogswell et al. | |
| 5,227,216 A | 7/1993 | Pettit | |
| 5,688,426 A | 11/1997 | Kirkwood et al. | |
| 5,854,142 A * | 12/1998 | Inoguchi | B32B 15/088 |
| | | | 442/233 |
| 6,037,060 A | 3/2000 | Blohowiak et al. | |
| 6,468,613 B1 | 10/2002 | Kitano et al. | |
| 6,641,893 B1 | 11/2003 | Suresh et al. | |
| 6,966,402 B2 | 11/2005 | Matias et al. | |
| 7,087,317 B2 | 8/2006 | Ehrstrom et al. | |
| 8,632,653 B2 | 1/2014 | Brown et al. | |
| 8,678,267 B2 | 3/2014 | Heck et al. | |
| 8,962,130 B2 | 2/2015 | Kruckenberg et al. | |
| 9,027,820 B2 | 5/2015 | Heck et al. | |
| 9,090,028 B2 | 7/2015 | McCarville et al. | |
| 9,090,043 B2 | 7/2015 | Matsen et al. | |
| 9,253,823 B2 | 2/2016 | Nordman et al. | |
| 9,358,764 B2 | 6/2016 | Prebil et al. | |
| 9,505,177 B2 * | 11/2016 | Fujioka | B29C 70/46 |
| 10,647,065 B2 * | 5/2020 | Alms | B32B 7/12 |
| 2002/0157859 A1 | 10/2002 | Vasoya et al. | |
| 2004/0087232 A1 | 5/2004 | Anderson et al. | |
| 2005/0175813 A1 | 8/2005 | Wingert et al. | |
| 2005/0271859 A1 | 12/2005 | Tuss et al. | |
| 2006/0143920 A1 | 7/2006 | Morrison et al. | |
| 2008/0185478 A1 | 8/2008 | Dannenberg | |
| 2009/0261199 A1 | 10/2009 | McCarville et al. | |
| 2010/0068497 A1 | 3/2010 | Harrington | |
| 2010/0127564 A1 | 5/2010 | Braden | |
| 2010/0264266 A1 | 10/2010 | Tsotsis | |
| 2011/0052910 A1 * | 3/2011 | Gunnink | B32B 15/14 |
| | | | 428/221 |
| 2011/0278395 A1 | 11/2011 | Telgkamp et al. | |
| 2012/0177872 A1 | 7/2012 | Tsai et al. | |
| 2012/0258323 A1 | 10/2012 | Brown | |
| 2013/0052897 A1 | 2/2013 | Rogers et al. | |
| 2013/0196121 A1 | 8/2013 | Beumler | |
| 2013/0242487 A1 | 9/2013 | Fujioka et al. | |
| 2013/0316148 A1 * | 11/2013 | Gunnink | B32B 27/18 |
| | | | 428/433 |
| 2014/0167500 A1 | 6/2014 | Frankenberger | |
| 2014/0329069 A1 | 11/2014 | Wilson et al. | |
| 2016/0016381 A1 | 1/2016 | Celis Marin et al. | |
| 2017/0101168 A1 | 4/2017 | Holemans et al. | |
| 2017/0284099 A1 | 10/2017 | Chien et al. | |
| 2018/0162101 A1 | 6/2018 | Stickler et al. | |
| 2018/0162102 A1 | 6/2018 | Stickler et al. | |
| 2018/0162103 A1 | 6/2018 | Stickler et al. | |
| 2018/0346093 A1 | 12/2018 | Trop et al. | |
| 2021/0268772 A1 | 9/2021 | Stickler et al. | |
| 2021/0323274 A1 | 10/2021 | Stickler et al. | |
| 2022/0161522 A1 | 5/2022 | Stickler et al. | |

FOREIGN PATENT DOCUMENTS

| | | | |
|---|---|---|---|
| EP | 2647486 A1 | 10/2013 | |
| JP | H08309926 A | 11/1996 | |
| JP | 2008016962 A | 1/2008 | |
| JP | 2010241101 A | 10/2010 | |
| JP | 2013249441 A | 12/2013 | |
| JP | 2014195990 A | 10/2014 | |
| JP | 2016036955 A | 3/2016 | |
| WO | 2009/096059 A1 | 8/2009 | |
| WO | 2011/064263 A3 | 6/2011 | |
| WO | 2012/073775 A1 | 6/2012 | |
| WO | 2016082599 A1 | 6/2016 | |
| WO | WO-2004071761 A1 * | 8/2024 | ............ B32B 15/14 |

OTHER PUBLICATIONS

Jan. 11, 2019 Final Office Action in related U.S. Appl. No. 15/378,931.
Jan. 25, 2019 Final Office Action in related U.S. Appl. No. 15/378,982.
Feb. 25, 2019 Final Office Action in related U.S. Appl. No. 15/708,894.
Aug. 22, 2019 Office Action in related U.S. Appl. No. 15/378,982.
Sep. 6, 2019 Office Action in related U.S. Appl. No. 15/378,931.
Sep. 6, 2019 Office Action in related U.S. Appl. No. 15/708,894.
Jan. 9, 2020 Final Office Action in related U.S. Appl. No. 15/378,931.
Feb. 20, 2020 Final Office Action in related U.S. Appl. No. 15/378,982.
Mar. 5, 2020 Final Office Action in related U.S. Appl. No. 15/708,894.
Oct. 6, 2020 Office Action in related U.S. Appl. No. 15/378,931.
Oct. 6, 2020 Office Action in related U.S. Appl. No. 15/378,982.
Feb. 19, 2021 Office Action in related U.S. Appl. No. 15/708,894.
Aug. 5, 2021 Final Office Action in related U.S. Appl. No. 15/708,894.
Mar. 1, 2021 First Notification of Office Action in corresponding Chinese Application No. 201711323612.4, 18 pages (includes English translation).
Dec. 6, 2021 Yu, Communication Pursuant to 94(3) EPC in related European Application No. 17203697.2, 5 pages.

(56) References Cited

OTHER PUBLICATIONS

Jan. 10, 2022 Decision of Rejection in corresponding Chinese Application No. 201711041430.8, 21 pages (includes English translation).
Botelho et al., "Evaluation of adhesion of continuous fiber-epoxy composite/aluminum laminates," Journal of Adhesion Science and Technology, vol. 18, No. 15-16, pp. 1799-1813 (2004).
Yu, Qianqian, Communication Pursuant to 94(3) EPC issued Sep. 25, 2019, in related European Application No. 17 203 697.2 (4 pages).
Yu, Qianqian, Communication Pursuant to 94(3) EPC issued Sep. 20, 2019, in corresponding European Application No. 17 206 292.9 (4 pages).
Author Unknown, "Typical Mechanical Properties of Wrought Aluminum Alloys at Various Temperatures", ASM International, The Materials Information Society, 1997, 10 pages.
Author Unknown, "Aluminum 1100", Alloy Digest, ASM International, 2002, 2 pages.
Lamontia et al., "Manufacturing Flat and Cylindrical Laminates and Built up Structure Using Automated Thermoplastic Tape Laying, Fiber Placement, and Filament Winding", 2002, 15 pages.
AGY, Product Information, S-2 Glass Fibers, High Strength Solutions To Your Toughest Reinforcement Challenges, Mar. 2004, 2 pages.
Reyes, "Manufacturing of New Low-Cost Lightweight Thermoplastic-Composite/Metal Hybrid Systems", Univ. of Michigan-Dearborn, Center for Engineering Education and Practice, 2005, 24 pages.
Automated Dynamics, Continuous S-2 Glass/PEEK Composite Typical Material Properties, 2007, 2 pages.
Carrillo et al., "Mechanical properties of a novel fiber-metal laminate based on a polypropylene composite", Mechanics of Materials, 41 (2009), pp. 828-838.
Sinke, J (2009). Manufacturing principles for fiber metal laminates. In W. Bank & M.R. Wisnom (Eds.), Proceedings of ICCM-17 (pp. 1-10). London: IOM.
Buser, "PEKK—the attractive alternative to PEEK Buser Nr. B25003", 2011, 1 page.
Cytec, Technical Data Sheet, APC-2-PEEK Thermoplastic Polymer, 2012, 9 pages.
Cytec, Technical Data Sheet, PEKK Thermoplastic Polymer, 2012, 6 pages.
Cytec, Technical Data Sheet, APC-2 Peek Thermoplastic Polymer, Mar. 19, 2012, 10 pages.
Cytec, Technical Data Sheet, Pekk Thermoplastic Polymer, Mar. 20, 2012, 6 pages.
AGY, Product Information, 933 S-2 Glass Yarn, 2013, 2 pages.
AGY, Product Information, GLARE Laminate with S-2 Glass Fiber, 2013, 2 pages.
Hexcel, HexTow AS4D 4000 Carbon Fiber, Product Data, 2013, 2 pages.
Livingston-Peters, "An Investigation Into the Properties and Fabrication Methods of Thermoplastic Composites", Thesis, Jun. 2014, 34 pages.
Cytec Solvay Group, APC PEKK, 2016, 1 page.
Cytec Solvay Group, APC-2 Peek, 2016, 1 page.
Abouhamzeh, "Distortions and Residual Stresses of GLARE Induced by Manufacturing", Thesis, 2016, 148 pages.
Stickler et al., "Laminate Structures Comprising Fiber-Reinforced Thermoplastic Prepreg Plies", U.S. Patent Application To Be Filed.
Extended European Search Report issued Apr. 5, 2018, in related European Patent Application No. 17203697.2, 8 pages.
Office Action mailed Jul. 13, 2018, in related U.S. Appl. No. 15/378,982.
Office Action mailed Oct. 3, 2018, in related U.S. Appl. No. 15/708,894.
First Notification of Office Action issued Dec. 17, 2020, in corresponding Chinese Application No. 201711041430.8, 24 pages (includes English translation).
Second Notification of Office Action issued Jun. 4, 2021, in corresponding Chinese Application No. 201711041430.8, 21 pages (includes English translation).
Written Opinion issued Sep. 9, 2021 in corresponding Brazilian Application No. BR102017026895 with English translation, 6 pages.
Extended European Search Report issued Mar. 21, 2018, in corresponding European Application No. 17206292.9, 9 pages.
Notification of Second Office Action in corresponding Chinese Application No. 201711323612.4 issued Jul. 28, 2021, 24 pages (includes English translation).
Omura, "Notice of Reasons for Rejection (Final Action)", issued Jun. 7, 2022 in corresponding Japanese Application No. 2017-237496 in both English and Japanese, 7 pages.
Omura, Hirokazu, Japanese Final Notification of Reasons for Refusal for Japanese Patent Application No. 2022-167351 dated Aug. 20, 2024, including English translation, 6 pages.

\* cited by examiner

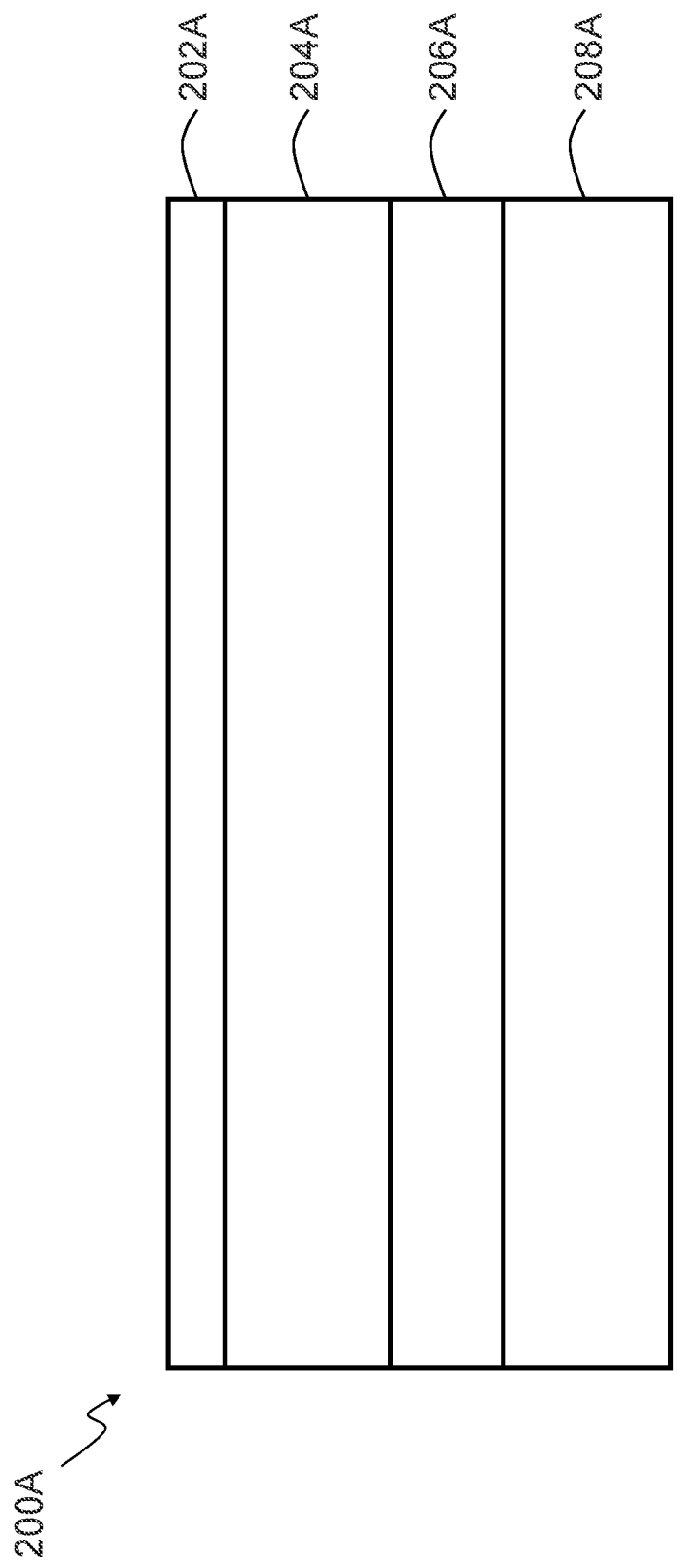

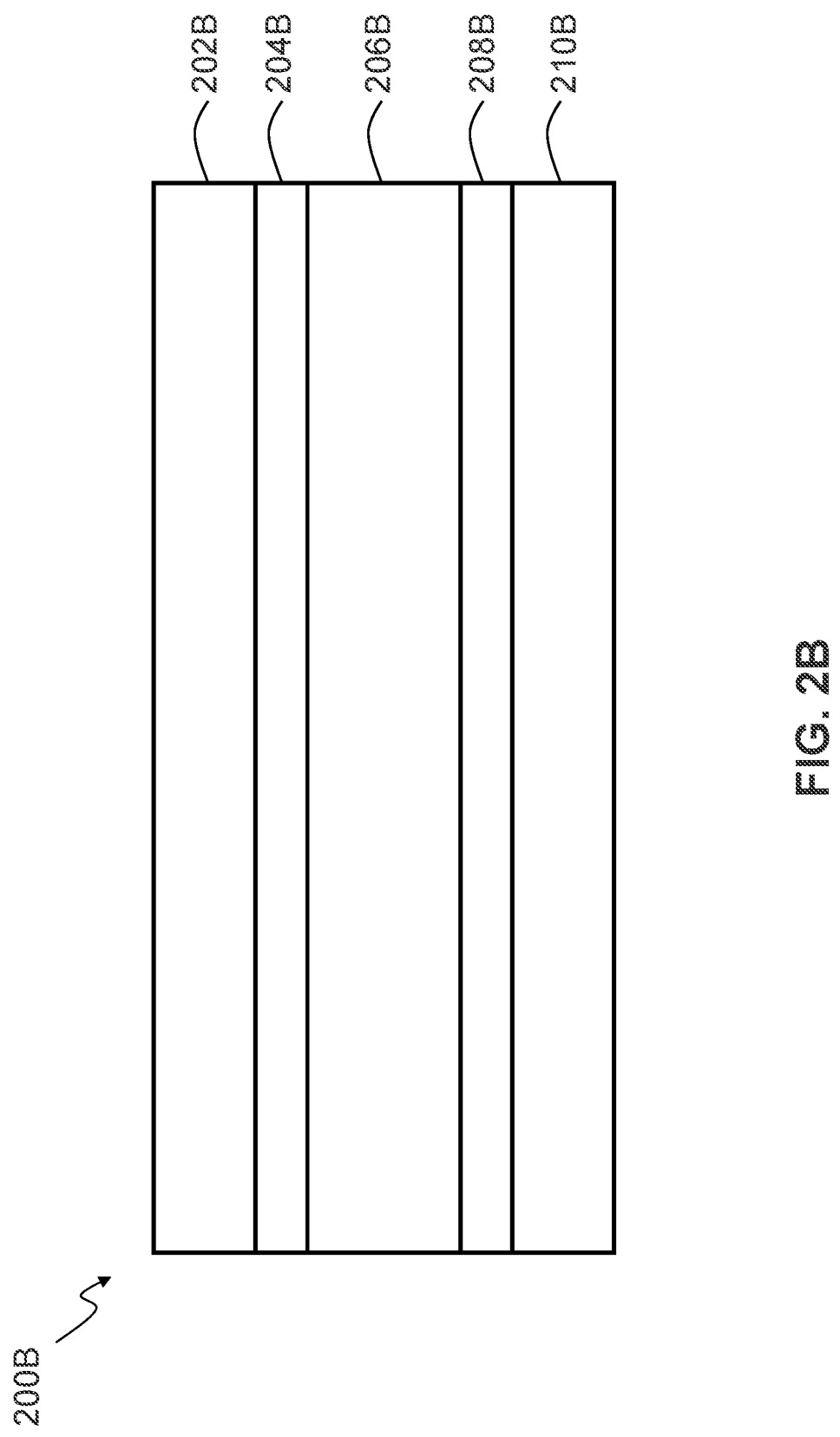

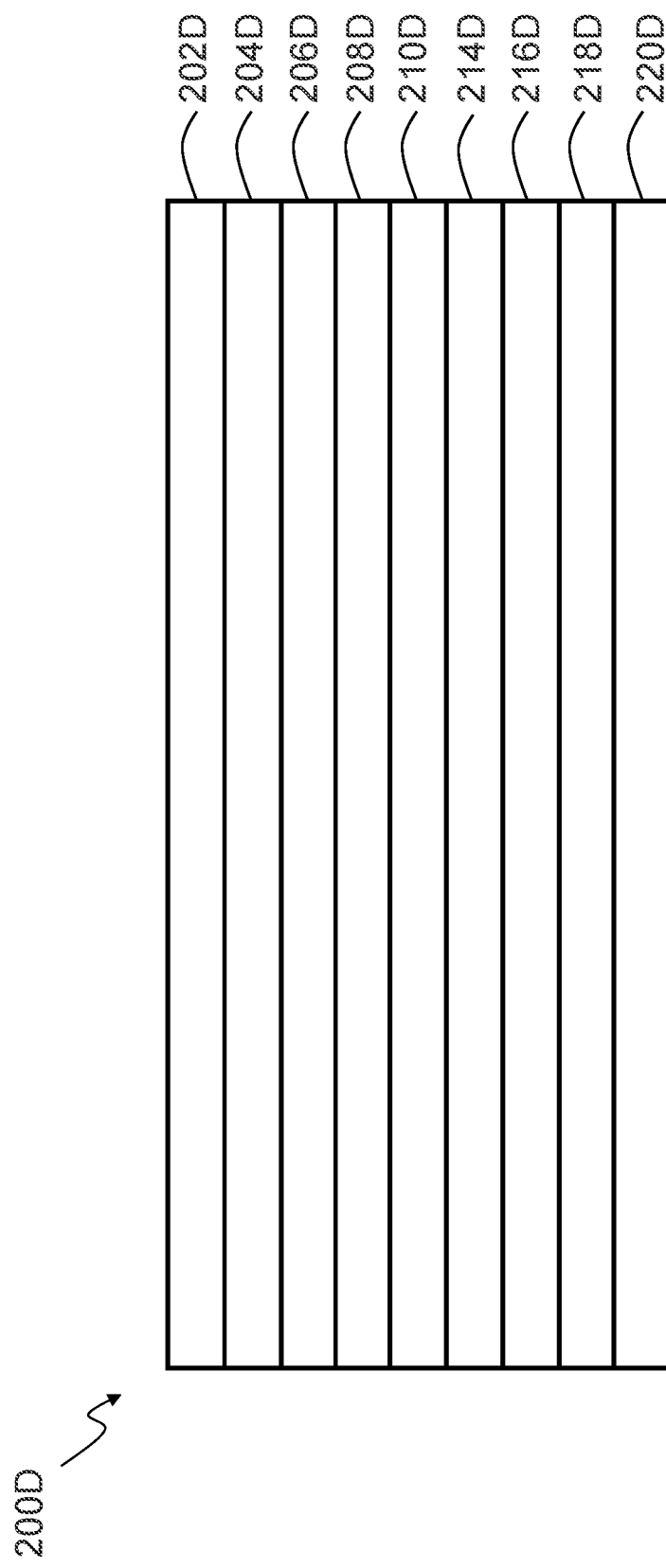

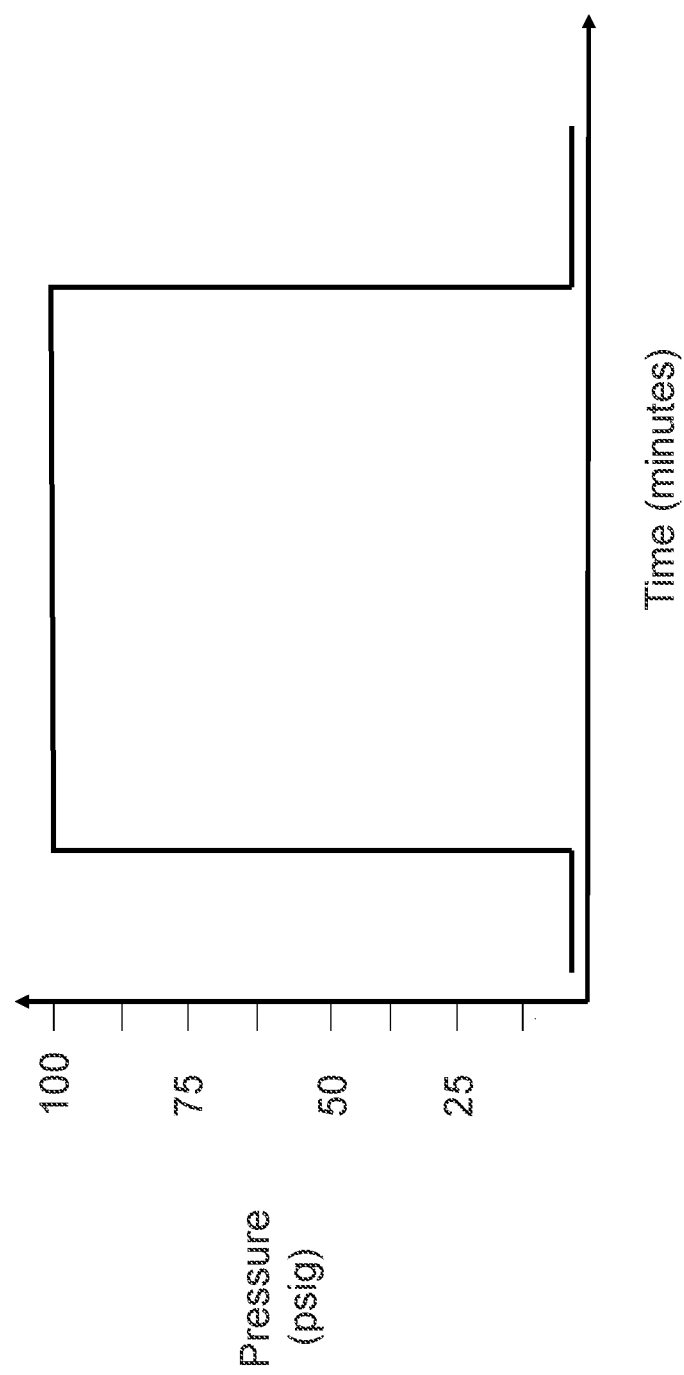

METHODS OF MANUFACTURING MATERIAL SYSTEMS

CROSS-REFERENCE TO RELATED APPLICATION(S)

This application is a divisional application of U.S. patent application Ser. No. 15/378,931 ("the '931 application"), filed on Dec. 14, 2016, in the U.S. Patent and Trademark Office ("USPTO"), and published as U.S. Patent Publication No. 2018/0162101 A1 on Jun. 14, 2018. The entire contents of that application and publication are incorporated herein by reference.

FIELD

The subject matter described herein generally relates to material systems and/or methods of manufacturing material systems. More particularly, the subject matter disclosed herein relates to material systems that comprise aluminum, glass composite, and/or carbon composite layers, and/or methods of manufacturing material systems that comprise aluminum, glass composite, and/or carbon composite layers.

BACKGROUND

Material systems may comprise aluminum, glass composite, and/or carbon composite layers. Such material systems may fall, for example, in the fiber metal laminate ("FML") category. FMLs may exhibit specific advantages when compared to simple metal structures. Such advantages may include, for example, improved resistance to corrosion, fatigue, fire, and/or impact. In addition or in the alternative, such advantages may include, for example, specialized strength properties and/or reduced weight per a given volume.

Many industries, such as the aerospace, automotive, and rail-transport industries, continually seek to push the boundaries of what has come before in material systems and methods of manufacturing material systems. Thus, there is a need for improved material systems and methods of manufacturing material systems.

SUMMARY

The present disclosure is directed to a material system. In some examples, the material system may comprise: a first aluminum layer; a first glass composite layer adjacent to the first aluminum layer; and/or a first carbon composite layer adjacent to the first glass composite layer, and opposite to the first aluminum layer. The first glass composite layer may comprise a first thermoplastic resin. The first thermoplastic resin may bond the first aluminum layer and the first glass composite layer.

In some examples, the first thermoplastic resin may bond the first glass composite layer and the first carbon composite layer.

In some examples, the first thermoplastic resin may comprise polyetheretherketone ("PEEK") or polyetherketoneketone ("PEKK").

In some examples, the first carbon composite layer may comprise a second thermoplastic resin.

In some examples, the second thermoplastic resin may comprise polyetheretherketone ("PEEK") or polyetherketoneketone ("PEKK").

In some examples, the first thermoplastic resin may be the same as the second thermoplastic resin.

In some examples, the first thermoplastic resin may differ from the second thermoplastic resin.

In some examples, the system may further comprise: a second glass composite layer adjacent to the first carbon composite layer, and opposite to the first glass composite layer.

In some examples, the system may further comprise: a second aluminum layer adjacent to the second glass composite layer, and opposite to the first carbon composite layer.

In some examples, the system may further comprise: a second carbon composite layer adjacent to the second glass composite layer, and opposite to the first carbon composite layer.

In some examples, the first aluminum layer may comprise a plurality of first aluminum sublayers.

In some examples, the first glass composite layer may comprise a plurality of first glass composite sublayers.

In some examples, the first carbon composite layer may comprise a plurality of first carbon composite sublayers.

In some examples, the first glass composite layer may comprise woven glass. A strength of the woven glass composite may vary with orientation of the woven glass.

The present disclosure is also directed to a method of manufacturing a material system. In some examples, the method of manufacturing a material system may comprise: stacking an aluminum layer, a glass composite layer that comprises one or more thermoplastic prepreg plies, and a carbon composite layer so that the aluminum layer is adjacent to the glass composite layer in the stack, and the glass composite layer is adjacent to the carbon composite layer in the stack; and/or consolidating the one or more thermoplastic prepreg plies at a temperature sufficient to soften the aluminum layer.

In some examples, the one or more thermoplastic prepreg plies may comprise polyetheretherketone ("PEEK") or polyetherketoneketone ("PEKK").

In some examples, the consolidating of the one or more thermoplastic prepreg plies may comprise: raising a temperature of the one or more thermoplastic prepreg plies to greater than or equal to 600° F.

In some examples, the consolidating of the one or more thermoplastic prepreg plies may comprise: raising a temperature of the stack to greater than or equal to 600° F.

The present disclosure is additionally directed to a method of manufacturing a material system. In some example embodiments, the method of manufacturing a material system may comprise: stacking an aluminum layer, a glass composite layer that comprises thermoplastic resin, and a carbon composite layer so that the glass composite layer is between the aluminum layer and the carbon composite layer in the stack; and/or adjusting temperature and pressure of the stack so as to consolidate the stack.

In some examples, the thermoplastic resin may comprise polyetheretherketone ("PEEK") or polyetherketoneketone ("PEKK").

It is to be understood that both the foregoing general description and the following detailed description are exemplary and explanatory only, and are not restrictive of the present teachings, as claimed.

DRAWINGS

The above and/or other aspects and advantages will become more apparent and more readily appreciated from the following detailed description of examples, taken in conjunction with the accompanying drawings, in which:

FIG. 2A shows a material system, according to some examples of the disclosed material systems;

FIG. 2B shows a material system, according to some examples of the disclosed material systems;

FIG. 2D shows a material system, according to some examples of the disclosed material systems;

Figure 4A:
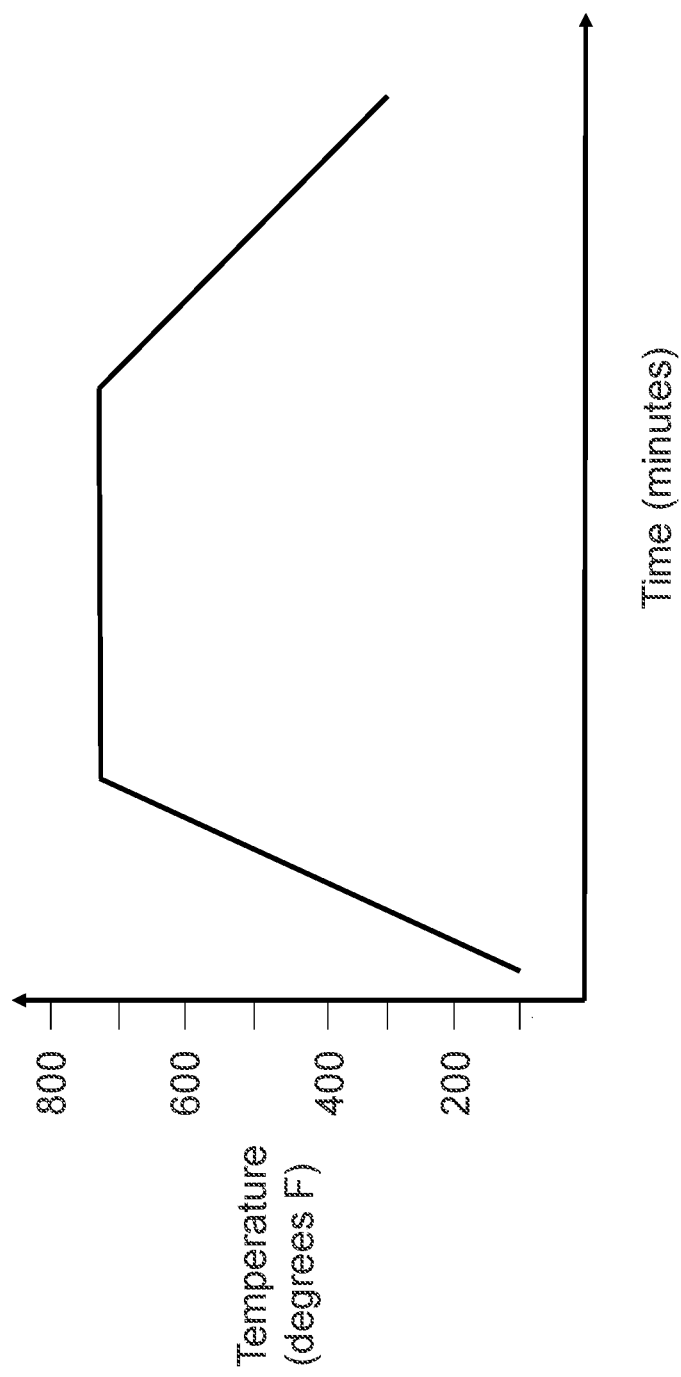
FIG. 4A shows a temperature versus time profile for consolidating one or more thermoplastic prepreg plies at a temperature sufficient to soften an aluminum layer, or for adjusting the temperature and pressure of a stack, according to some examples of the disclosed material systems.
Figure 4C:
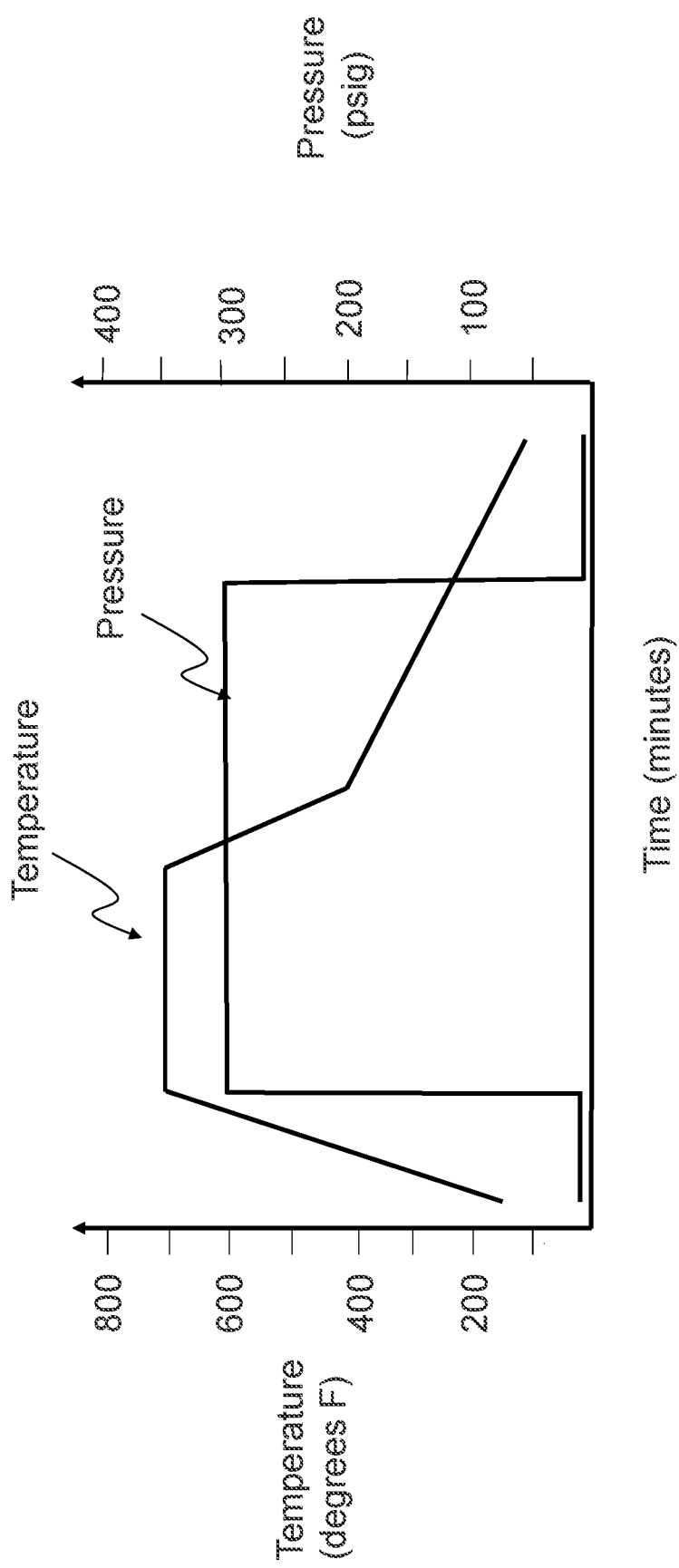

FIG. 4B shows a pressure versus time profile for consolidating one or more thermoplastic prepreg plies at a temperature sufficient to soften an aluminum layer, or for adjusting the temperature and pressure of a stack, according to some examples of the disclosed material systems; and FIG. 4C shows a temperature and pressure versus time profile for consolidating one or more thermoplastic prepreg plies at a temperature sufficient to soften an aluminum layer, or for adjusting the temperature and pressure of a stack, according to some examples of the disclosed material systems.

DETAILED DESCRIPTION

Exemplary aspects will now be described more fully with reference to the accompanying drawings. Examples of the disclosure, however, may be embodied in many different forms and should not be construed as being limited to the examples set forth herein. Rather, these examples are provided so that this disclosure will be thorough and complete, and will fully convey the scope to those skilled in the art. In the drawings, some details may be simplified and/or may be drawn to facilitate understanding rather than to maintain strict structural accuracy, detail, and/or scale. For example, the thicknesses of layers and regions may be exaggerated for clarity.

It will be understood that when an element is referred to as being "on," "connected to," "electrically connected to," or "coupled to" to another component, it may be directly on, connected to, electrically connected to, or coupled to the other component or intervening components may be present. In contrast, when a component is referred to as being "directly on," "directly connected to," "directly electrically connected to," or "directly coupled to" another component, there are no intervening components present. As used herein, the term "and/or" includes any and all combinations of one or more of the associated listed items.

It will be understood that although the terms first, second, third, etc., may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section. For example, a first element, component, region, layer, or section could be termed a second element, component, region, layer, or section without departing from the teachings of examples.

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation(s) depicted in the figures.

The terminology used herein is for the purpose of describing particular examples only and is not intended to be limiting of examples. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which examples belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Figure 1A:
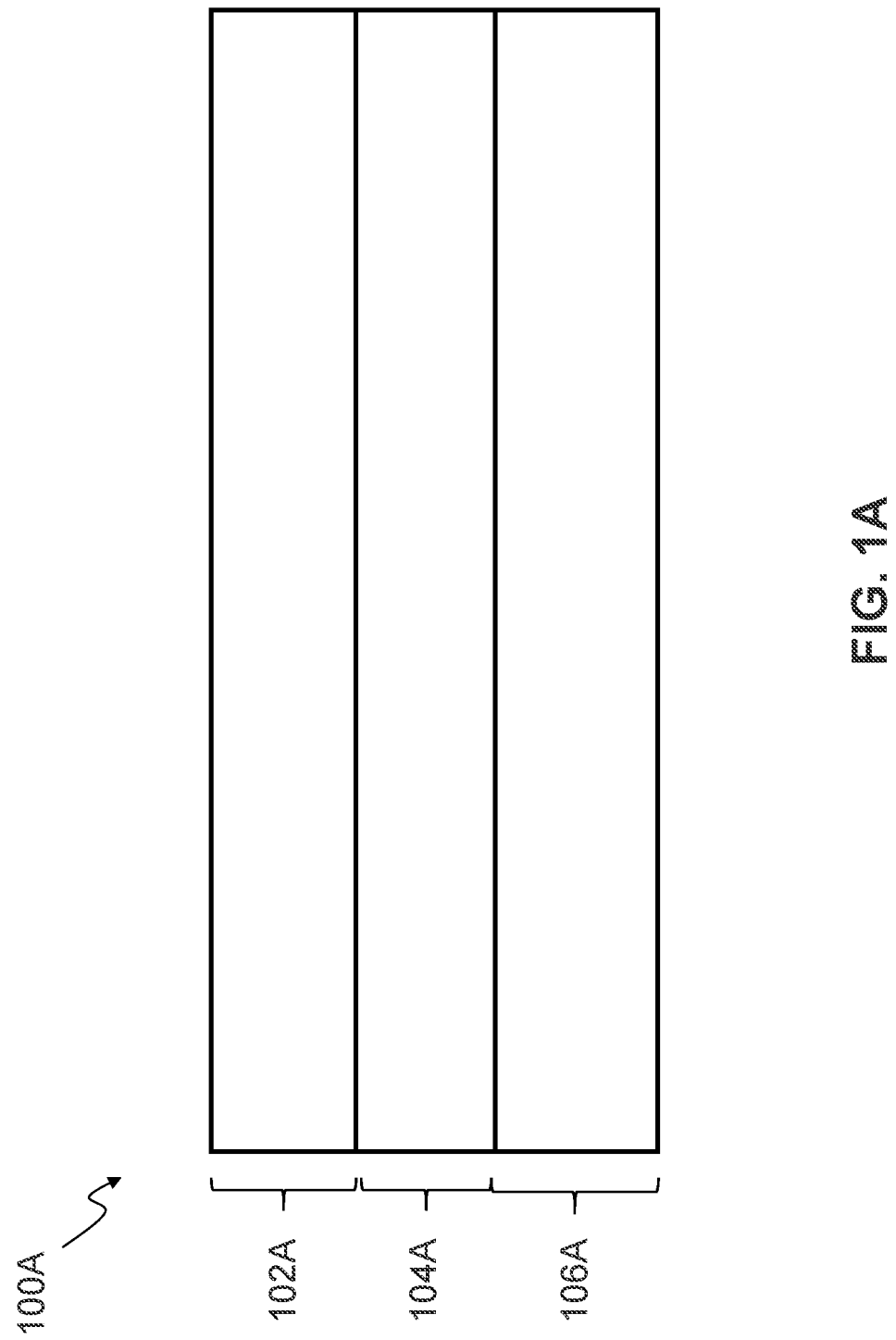
FIG. 1A shows a material system, according to some examples of the disclosed material systems.

The present disclosure is directed to material systems and/or methods of manufacturing material systems. FIG. 1A shows material system 100A, according to some examples of the disclosed material systems. As shown in FIG. 1A, material system 100A comprises: aluminum layer 102A; glass composite layer 104A adjacent to aluminum layer 102A; and carbon composite layer 106A adjacent to glass composite layer 104A, and opposite to aluminum layer 102A. Glass composite layer 104A may comprise a first thermoplastic resin. The first thermoplastic resin may bond aluminum layer 102A and glass composite layer 104A.

Material system 100A may provide, for example, reduced weight per given volume as compared to simple metal structures.

Aluminum layer 102A, glass composite layer 104A, and carbon composite layer 106A may have the same or different thicknesses.

Aluminum layer 102A may or may not have aluminum sublayers; glass composite layer 104A may or may not have glass composite sublayers; and/or carbon composite layer 106A may or may not have carbon composite sublayers.

As used herein, the term "aluminum" means the metallic element of atomic number 13, including any isotopes thereof.

As used herein, the term "alloy" means a solid or liquid mixture of two or more metals, or of one or more metals with one or more nonmetallic elements, as in carbon steels.

As used herein, the term "layer" means a thickness of material laid on, formed on, or spread over a surface, body, or portion of a surface or body. A layer may cover the surface, body, or portion of the surface or body, or form an overlying part or segment of material that covers the surface, body, or portion of the surface or body. A layer may have constant or variable thickness.

As used herein, the term "aluminum layer" means a layer comprising aluminum. An aluminum layer may comprise, for example, pure aluminum, an aluminum alloy, or some other substance that comprises aluminum. The aluminum layer may comprise, for example, 1100 series aluminum (e.g., a commercially pure alloy of aluminum, such as 1100-O, 1100-H12, 1100-H14, 1100-H16, 1100-H18, 1100-H22, 1100-H24, 1100-H26, 1100-H28, 1100-H112, or 1100-H113 aluminum according to the International Alloy Designation System ("IADS")). More generally, the aluminum layer may comprise, for example, a 1000 series aluminum alloy (e.g., aluminum alloy 1050, 1060, 1100, 1145, 1199, 1200, 1230, or 1350 according to IADS); a 2000 series aluminum alloy (e.g., aluminum alloy 2008, 2011, 2014, 2017, 2018, 2024, 2025, 2036, 2048, 2090, 2117, 2124, 2127, 2195, 2218, 2219, 2224, 2319, 2324, 2524, or 2618 according to IADS); a 3000 series aluminum alloy (e.g., aluminum alloy 3003, 3004, 3005, 3102, or 3105 according to IADS); a 5000 series aluminum alloy (e.g., aluminum alloy 5005, 5050, 5052, 5056, 5059, 5083, 5086, 5154, 5182, 5183, 5252, 5254, 5356, 5357, 5454, 5456, 5457, 5554, 5556, 5652, 5654, 5657, or 5754 according to IADS); a 6000 series aluminum alloy (e.g., aluminum alloy 6003, 6005, 6005A, 6009, 6010, 6013, 6016, 6053, 6060, 6061, 6062, 6063, 6066, 6070, 6082, 6101, 6105, 6111, 6151, 6162, 6201, 6205, 6253, 6262, 6351, 6463, or 6951 according to IADS); or a 7000 series aluminum alloy (e.g., aluminum alloy 7001, 7005, 7008, 7022, 7039, 7049, 7050, 7055, 7068, 7072, 7075, 7076, 7079, 7108, 7116, 7129, 7150, 7175, 7178, or 7475 according to IADS)

The pure aluminum, aluminum alloys, and/or other substances that comprise aluminum discussed above may be compatible with high-temperature processing (e.g., at temperatures required for thermoplastic processing or consolidation, such as 600° F., 650° F., 675° F., or 700° F., but less than the melting temperature of the pure aluminum, aluminum alloys, and/or other substances that comprise aluminum). For example, the pure aluminum, aluminum alloys, and/or other substances that comprise aluminum discussed above may exhibit low yield strength(s) (e.g., $\leq 7.2 \times 10^3$ pounds per square inch gage ("psig"), $\leq 5.8 \times 10^3$ psig, $\leq 5.1 \times 10^3$ psig, or $\leq 4.3 \times 10^3$ psig), helping to reduce residual thermal stresses in other layers during and/or after cooldown. Other factors may help to reduce residual thermal stresses in other layers during and/or after cooldown, such as the thickness of the pure aluminum, aluminum alloys, and/or other substances that comprise aluminum discussed above; the existence and number of sublayers of the pure aluminum, aluminum alloys, and/or other substances that comprise aluminum discussed above; and/or whether the pure aluminum, aluminum alloys, and/or other substances that comprise aluminum discussed above are in direct contact with a specific adjacent layer (e.g., a glass composite layer).

Surfaces of the aluminum layer may undergo surface preparation, such as alkaline degreasing, chromic acid anodizing or other anodizing processing, priming (e.g., with BR 127 corrosion-inhibiting primer), sol-gel, and/or pickling in chromic-sulfuric acid. The surfaces also may be roughened, for example, by abrasion. Such surface preparation may enhance bonding between the aluminum layer(s) and other layers.

The aluminum layer(s) may be depended on to provide significant structural support. Generally, in such cases, the number and/or thickness of the aluminum layer(s) are greater than when the aluminum layer(s) are not depended on to provide significant structural support. Whether or not depended on to provide significant structural support, thicknesses of the aluminum layer(s) may be, for example, 0.005 inches and 0.020 inches (e.g., 0.005 inches, 0.010 inches, 0.015 inches, or 0.020 inches). When depended on to provide significant structural support, thicknesses of the aluminum layer(s) may be even greater than 0.0020 inches.

As used herein, the term "composite" means a mixture or mechanical combination on a macroscale of two or more materials that are solid in the finished state, are mutually insoluble, and differ in chemical nature.

As used herein, the term "tenacity" means the strength per unit weight of a fiber, typically expressed in grams per denier.

As used herein, the term "fiber" means a fundamental form of solid (usually crystalline) characterized by relatively high tenacity and an extremely high ratio of length to diameter (e.g., several hundred or more to one). Semisynthetic fibers include inorganic substances extruded in fibrous form using, for example, carbon or glass. Synthetic fibers include substances extruded in fibrous form using, for example, high polymers.

As used herein, the term "glass" means a non-crystalline, amorphous solid. The glass may comprise, for example, a ceramic material comprising a mixture of silica, soda ash, and lime. The glass may comprise, for example, one or more of C-glass, E-glass, S-glass, or T-glass. The glass may be, for example, in the form of glass fibers (e.g., fiberglass). The glass may comprise, for example, S-2 glass (e.g., S-2 glass fibers).

The glass fibers may be woven or nonwoven (e.g., chopped, matted, or randomly oriented). The strength of the woven fibers may vary with the type of weave and/or the orientation of the woven fibers (e.g., if the woven fibers are oriented in parallel, the strength of the woven fibers as a group should be greater in directions parallel to that orientation). The type of weave may be, for example, a plain weave (e.g., 1×1), a twill weave (e.g., 2×2), a basket weave, a fish weave, a harness weave, a leno weave, a satin weave, or a unidirectional weave.

As used herein, the term "matrix" means a substance used to hold together strength members of a composite, where the substance is one of the two or more materials of the composite.

As used herein, the term "resin" means a semisolid or solid complex amorphous mix of organic compounds.

As used herein, the term "monomer" means a molecule or compound, usually comprising carbon, and of relatively low molecular weight and simple structure.

As used herein, the term "polymer" means a macromolecule formed by the chemical union of five or more identical monomers. A polymer may be, for example, inorganic or organic. An organic polymer may be, for example, natural or synthetic (e.g., man-made). A synthetic organic polymer may be, for example, thermoplastic or thermosetting.

As used herein, the term "high polymer" means an organic polymer having a molecular weight 5,000 grams/mole.

As used herein, the term "thermoplastic" means a high polymer, as defined above, that softens when exposed to heat and returns to its original condition when cooled to room temperature. A thermoplastic polymer may be, for example, amorphous or semi-crystalline. A thermoplastic polymer may comprise, for example, one or more of polyaryletherketone ("PAEK"), polyetherimide ("PEI"), or polyphenylene sulfide ("PPS"). A polyaryletherketone may comprise, for example, one or more of polyetherketone ("PEK"), polyetheretherketone ("PEEK"), polyetherketoneketone ("PEKK"), polyetheretherketoneketone ("PEEKK"), or polyetherketoneetherketoneketone ("PEKE KK").

As used herein, the term "thermosetting polymer" means a high polymer, as defined above, that crosslinks upon the application of heat, and solidifies or "sets" irreversibly.

As used herein, the term "glass composite layer" means a layer comprising a composite that comprises glass. The glass may be, for example, in the form of glass fibers. The glass fibers in the glass composite layer may have no specific orientation (e.g., omnidirectional) or may be oriented in one or more directions (e.g., unidirectional, bidirectional, or multidirectional). The glass fibers may be aligned, continuous, and/or unidirectional.

A glass composite layer comprises, for example, a matrix. The matrix may comprise, for example, resin. The resin may comprise, for example, a thermoplastic polymer. The thermoplastic polymer may comprise, for example, one or more of PEEK (PEEK has a relatively high glass transition temperature (about 290° F.) and melting temperature (about 650° F.), allowing for high-temperature processing), PEKK (PEKK has a relatively high glass transition temperature (about 315° F.) and melting temperature (about 640° F.), allowing for high-temperature processing), or other thermoplastic polymers. A glass composite layer may comprise, for example, glass-fiber-reinforced polymer(s). A glass composite layer may comprise, for example, glass-fiber-reinforced thermoplastic(s).

As used herein, the term "prepreg" is an abbreviation for "pre-impregnated" composite fibers in which a matrix material, such as thermoplastic resin, is already present in the fiber reinforcement before molding occurs. Prepreg manufacturing techniques may be employed to manufacture composite parts for a variety of commercial uses including, for example, the manufacture of aircraft and/or spacecraft. Composite part manufacturing using prepreg manufacturing methods may be rate-limiting in the production of composite products.

As used herein, the term "prepreg plies" includes both prepreg fabrics and prepreg tapes.

The thermoplastic resin of the one or more glass-fiber-reinforced thermoplastic prepreg plies provides binding for the glass fibers. The thermoplastic resin may exhibit a sufficiently high glass transition temperature, continuous service temperature, and/or crystallite melting point so as to allow the aluminum layer(s) (e.g., aluminum layer 102A) to be softened for molding, shaping, and/or other processes associated with manufacture of the material systems(s).

The glass composite layer(s) may be depended on to provide significant structural support. Generally, in such cases, the number and/or thickness of the glass composite layer(s) are greater than when the glass composite layer(s) are not depended on to provide significant structural support.

Whether or not depended on to provide significant structural support, thicknesses of the glass composite layer(s) may be, for example, 0.0020 inches and 0.0080 inches (e.g., 0.0020 inches, 0.0025 inches, 0.0030 inches, 0.0035 inches, 0.0040 inches, 0.0045 inches, 0.0050 inches, 0.0055 inches, 0.0060 inches, 0.0065 inches, 0.0070 inches, 0.0075 inches, or 0.0080 inches). When depended on to provide significant structural support, thicknesses of the glass composite layer(s) may be even greater than 0.0080 inches.

Whether or not depended on to provide significant structural support, thicknesses of the sublayers of the glass composite layer(s) may be, for example, 0.0020 inches and 0.0040 inches (e.g., 0.0020 inches, 0.0025 inches, 0.0030 inches, 0.0035 inches, or 0.0040 inches). When depended on to provide significant structural support, thicknesses of the glass composite sublayer(s) may be even greater than 0.0040 inches.

As used herein, the term "adjacent" means "near or directly contacting."

Resin of the glass composite layer may directly bond the aluminum layer and the glass composite layer (e.g., aluminum layer 102A and glass composite layer 104A). In such cases, glass composite layer 104A may be adjacent to aluminum layer 102A, and may directly contact aluminum layer 102A.

An additional layer (not shown) may be between aluminum layer 102A and glass composite layer 104A. In such cases, glass composite layer 104A may be adjacent to aluminum layer 102A, but may not directly contact aluminum layer 102A. The additional layer may improve the bonding of aluminum layer 102A and glass composite layer 104A. The additional layer may at least partially decouple effects (e.g., thermal contraction, thermal expansion, strains, or stresses) associated with the bonding of aluminum layer 102A and glass composite layer 104A.

The additional layer may be, for example, an adhesive layer. Care should be taken during selection of material(s) for such an additional layer because, for example, some adhesives comprise silver or other elements or compounds that may interact with aluminum layer 102A and/or glass composite layer 104A via one or more interaction mechanisms (e.g., galvanic corrosion).

As used herein, the term "carbon" means the nonmetallic element of atomic number 6, including any isotopes thereof.

As used herein, the term "carbon composite layer" means a layer comprising a composite that comprises carbon. The carbon may be, for example, in the form of carbon fibers. The carbon fibers in the carbon composite layer may have no specific orientation (e.g., omnidirectional) or may be oriented in one or more directions (e.g., unidirectional, bidirectional, or multidirectional). The carbon fibers may be aligned, continuous, and/or unidirectional.

The carbon fibers may be woven. The strength of the woven fibers may vary with the type of weave and/or the orientation of the woven fibers (e.g., if the woven fibers are oriented in parallel, the strength of the woven fibers as a group should be greater in directions parallel to that orientation). The type of weave may be, for example, a plain weave (e.g., 1×1), a twill weave (e.g., 2×2), a basket weave, a fish weave, a harness weave, a leno weave, a satin weave, or a unidirectional weave.

A carbon composite layer comprises, for example, a matrix. The matrix may comprise, for example, resin. The resin may comprise, for example, a thermoplastic polymer. The thermoplastic polymer may comprise, for example, one or more of PEEK, PEKK, or other thermoplastic polymers. A carbon composite layer may comprise, for example, carbon-fiber-reinforced polymer(s). A carbon composite layer may comprise, for example, carbon-fiber-reinforced thermoplastic(s).

The thermoplastic resin of the one or more carbon-fiber-reinforced thermoplastic prepreg plies provides binding for the carbon fibers. The thermoplastic resin may exhibit a sufficiently high glass transition temperature, continuous service temperature, and/or crystallite melting point so as to allow the aluminum layer(s) (e.g., aluminum layer 102A) to be softened for molding, shaping, and/or other processes associated with manufacture of the material system(s).

The carbon composite layer(s) may be depended on to provide significant structural support. Generally, in such cases, the number and/or thickness of the carbon composite layer(s) are greater than when the carbon composite layer(s) are not depended on to provide significant structural support.

Whether or not depended on to provide significant structural support, thicknesses of the carbon composite layer(s) may be, for example, 0.0400 inches and 0.0800 inches (e.g., 0.0400 inches, 0.0432 inches, 0.0440 inches, 0.0450 inches, 0.0500 inches, 0.0550 inches, 0.0600 inches, 0.0650 inches, 0.0700 inches, 0.0750 inches, or 0.0800 inches). When depended on to provide significant structural support, thicknesses of the carbon composite layer(s) may be even greater than 0.0800 inches.

Whether or not depended on to provide significant structural support, thicknesses of the sublayers of the carbon composite layer(s) may be, for example, 0.0040 inches and 0.0080 inches (e.g., 0.0040 inches, 0.0044 inches, 0.0045 inches, 0.0050 inches, 0.0054 inches, 0.0055 inches, 0.0060 inches, 0.0065 inches, 0.0070 inches, 0.0075 inches, or 0.0080 inches). When depended on to provide significant structural support, thicknesses of the carbon composite sublayer(s) may be even greater than 0.0080 inches.

The first glass composite layer and/or the one or more glass-fiber-reinforced thermoplastic prepreg plies may comprise first thermoplastic resin, the first carbon composite layer and/or the one or more carbon-fiber-reinforced thermoplastic prepreg plies may comprise second thermoplastic resin, and the first thermoplastic resin may be the same as the second thermoplastic resin. When the first thermoplastic resin is the same as the second thermoplastic resin, manufacture of the material system(s) may be simplified, and the bonding between the first glass composite layer and/or the one or more glass-fiber-reinforced thermoplastic prepreg plies, and the first carbon composite layer and/or the one or more carbon-fiber-reinforced thermoplastic prepreg plies, may be more uniform and/or more stable over time due, for example, to compatibility of the first and second thermoplastic resins.

The first glass composite layer and/or the one or more glass-fiber-reinforced thermoplastic prepreg plies may comprise first thermoplastic resin, the first carbon composite layer and/or the one or more carbon-fiber-reinforced thermoplastic prepreg plies may comprise second thermoplastic resin, and the first thermoplastic resin may differ from the second thermoplastic resin. When the first thermoplastic resin differs from the second thermoplastic resin, more design options may be available during manufacture of the material system(s), and the bonding between the first glass composite layer and/or the one or more glass-fiber-reinforced thermoplastic prepreg plies, and the first carbon composite layer and/or the one or more carbon-fiber-reinforced thermoplastic prepreg plies, may be stronger initially and/or over time, particularly if the first and second thermoplastic resins are selected for mutual chemical compatibility.

The glass composite layer(s) may be configured to prevent interaction (e.g., direct) between the aluminum layer and the carbon composite layer (e.g., glass composite layer 104A may be configured to prevent interaction between aluminum layer 102A and carbon composite layer 106A). The glass composite layer(s) may be configured to prevent galvanic corrosion due to interaction (e.g., direct or indirect) between the aluminum layer and the carbon composite layer (e.g., glass composite layer 104A may be configured to prevent galvanic corrosion due to interaction between aluminum layer 102A and carbon composite layer 106A).

The glass composite layer(s) may be configured to reduce thermal stress, during cooldown (e.g., during a consolidation process), due to differences in thermal contraction between the aluminum layer and the carbon composite layer (e.g., glass composite layer 104A may be configured to reduce thermal stress, during cooldown, due to differences in thermal contraction between aluminum layer 102A and carbon composite layer 106A), for example, by at least partially decoupling the effects of thermal contraction in the aluminum and carbon composite layers and/or through effects associated with orientation of glass fibers in the glass composite layer(s). The glass composite layer(s) may be configured to reduce residual thermal stress, after cooldown (e.g., after a consolidation process), due to differences in thermal contraction, during cooldown, between the aluminum layer and the carbon composite layer (e.g., glass composite layer 104A may be configured to reduce residual thermal stress, after cooldown, due to differences in thermal contraction, during cooldown, between aluminum layer 102A and carbon composite layer 106A), for example, by at least partially decoupling the effects of thermal contraction in the aluminum and carbon composite layers and/or through effects associated with orientation of glass fibers in the glass composite layer(s).

One or more glass composite layers may be configured to reduce thermal stress, both during and after cooldown, functioning as a compliant layer or layers. This compliant functioning helps to avoid separation of adjacent layers due to the build-up of stress near, at, or across boundaries between the adjacent layers.

Resin of the glass composite layer may directly bond the glass composite layer and the carbon composite layer (e.g., glass composite layer 104A and carbon composite layer 106A). In such cases, glass composite layer 104A may be adjacent to carbon composite layer 106A, and may directly contact carbon composite layer 106A.

Resin of the carbon composite layer may directly bond the glass composite layer and the carbon composite layer (e.g., glass composite layer 104A and carbon composite layer 106A). In such cases, glass composite layer 104A may be adjacent to carbon composite layer 106A, and may directly contact carbon composite layer 106A.

Resins of the glass and carbon composite layers may directly bond the glass composite layer and the carbon composite layer (e.g., glass composite layer 104A and carbon composite layer 106A). In such cases, glass composite layer 104A may be adjacent to carbon composite layer 106A, and may directly contact carbon composite layer 106A.

An additional layer (not shown) may be between glass composite layer 104A and carbon composite layer 106A. In such cases, glass composite layer 104A may be adjacent to carbon composite layer 106A, but may not directly contact carbon composite layer 106A. The additional layer may improve the bonding of glass composite layer 104A and carbon composite layer 106A. The additional layer may at least partially decouple effects (e.g., thermal contraction, thermal expansion, strains, or stresses) associated with the bonding of glass composite layer 104A and carbon composite layer 106A.

The additional layer may be, for example, an adhesive layer. Care should be taken during selection of material(s) for such an additional layer because, for example, some adhesives comprise elements or compounds that may interact with glass composite layer 104A and/or carbon composite layer 106A via one or more interaction mechanisms.

One or more layers may be between a given aluminum layer and a given carbon composite layer. The one or more layers may comprise, for example, glass composite layer(s) and/or adhesive layer(s). The one or more layers may be configured to prevent interaction (e.g., direct) between the aluminum layer(s) and the carbon composite layer(s) (e.g., configured to prevent interaction between aluminum layer 102A and carbon composite layer 106A). The one or more layers may be configured to prevent galvanic corrosion due to interaction (e.g., direct or indirect) between the aluminum layer(s) and the carbon composite layer(s) (e.g., configured to prevent galvanic corrosion due to interaction between aluminum layer 102A and carbon composite layer 106A).

Figure 1B:
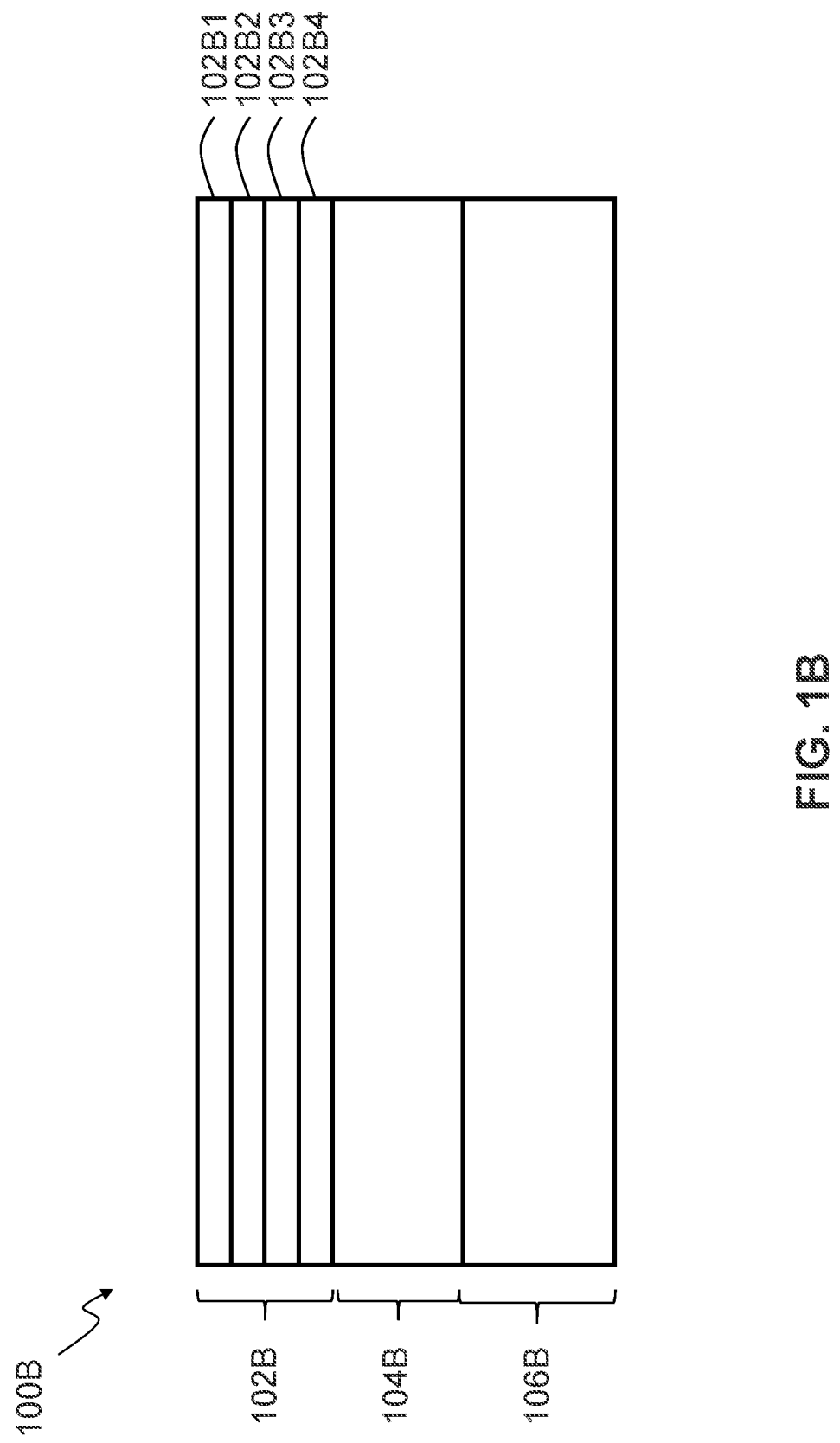
FIG. 1B shows a material system, according to some examples of the disclosed material systems.

FIG. 1B shows material system 100B, according to some examples of the disclosed material systems. As shown in FIG. 1B, material system 100B comprises: aluminum layer 102B; glass composite layer 104B adjacent to aluminum layer 102B; and carbon composite layer 106B adjacent to glass composite layer 104B, and opposite to aluminum layer 102B. Aluminum layer 102B may comprise a plurality of aluminum sublayers 102B1, 102B2, 102B3, 102B4 (e.g., 102B1, 102B2, ..., 102Bn). The number (n) of aluminum sublayers may be, for example, 2, 3, 4, 5, 6, or more sublayers.

Aluminum layer 102B, glass composite layer 104B, and carbon composite layer 106B may have the same or different thicknesses. Similarly, plurality of aluminum sublayers 102B1, 102B2, 102B3, 102B4 may have the same or different thicknesses.

Figure 1C:
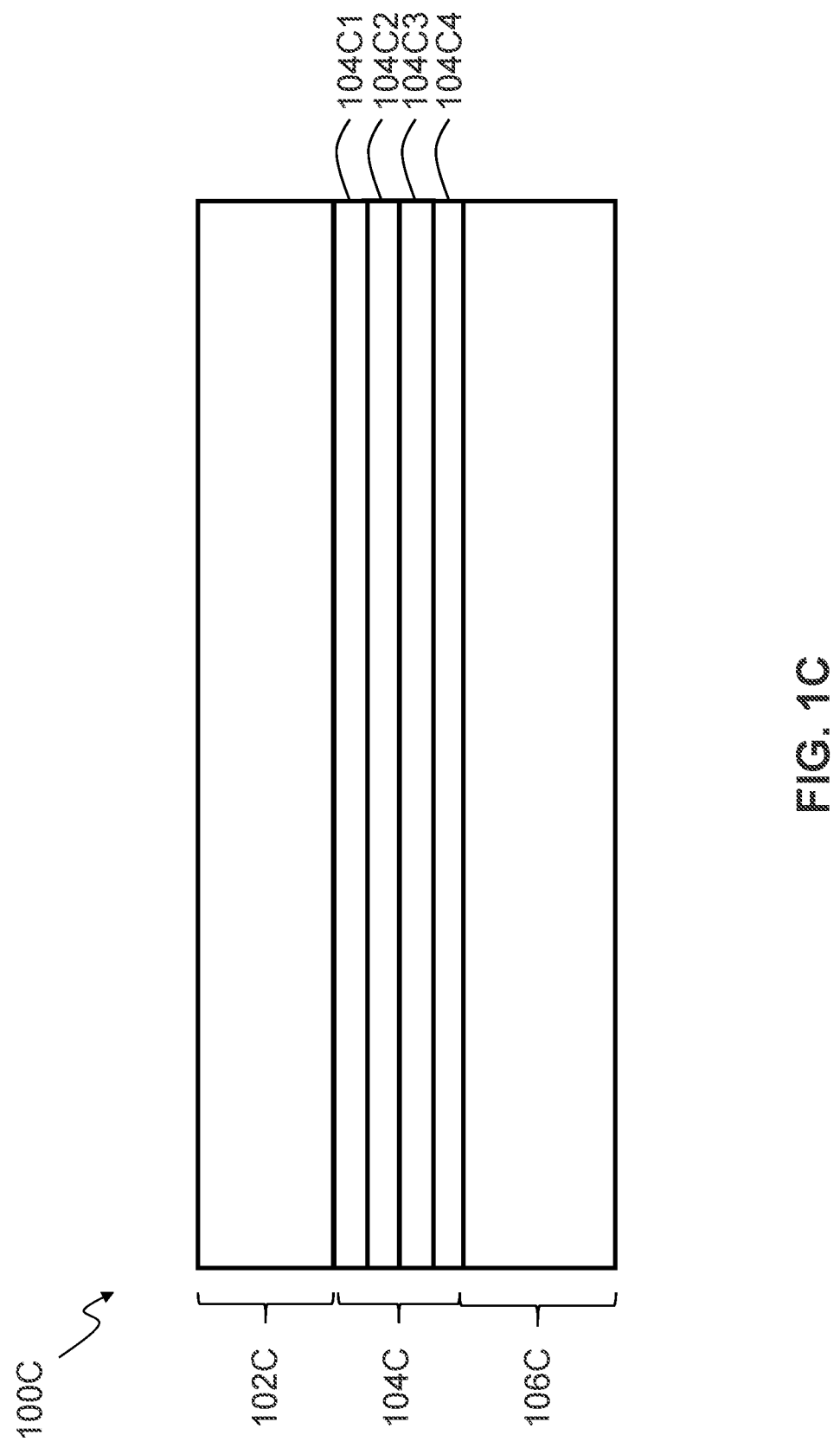
FIG. 1C shows a material system, according to some examples of the disclosed material systems.

FIG. 1C shows material system 100C, according to some examples of the disclosed material systems. As shown in FIG. 1C, material system 100C comprises: aluminum layer 102C; glass composite layer 104C adjacent to aluminum layer 102C; and carbon composite layer 106C adjacent to glass composite layer 104C, and opposite to aluminum layer 102C. Glass composite layer 104C may comprise a plurality of glass composite sublayers 104C1, 104C2, 104C3, 104C4 (e.g., 104C1, 104C2, ..., 104Cn). The number (n) of glass composite sublayers may be, for example, 2, 3, 4, 5, 6, 7, 8, 9, 10, 11, 12, or more sublayers.

Aluminum layer 102C, glass composite layer 104C, and carbon composite layer 106C may have the same or different thicknesses. Similarly, plurality of glass composite sublayers 104C1, 104C2, 104C3, 104C4 may have the same or different thicknesses.

Figure 1D:
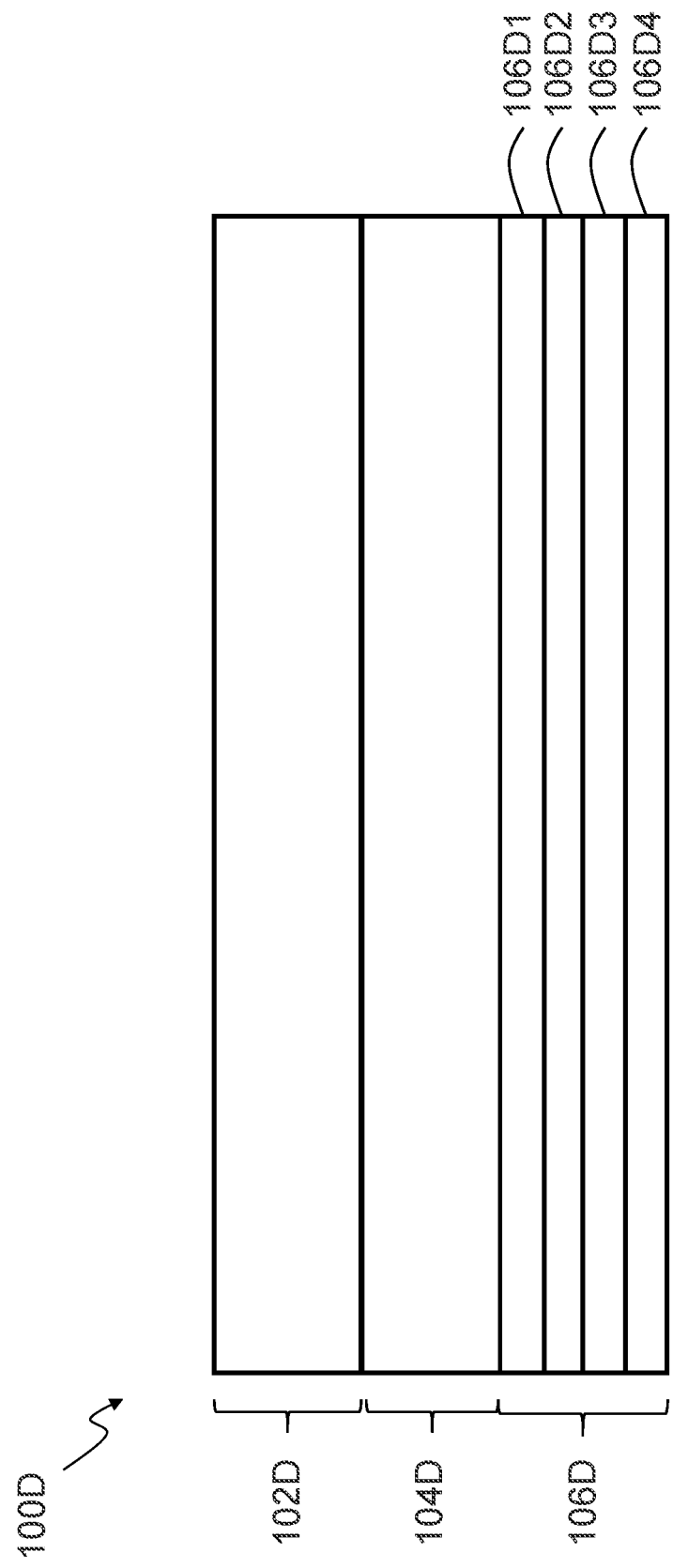
FIG. 1D shows a material system, according to some examples of the disclosed material systems.

FIG. 1D shows material system 100D, according to some examples of the disclosed material systems. As shown in FIG. 1D, material system 100D comprises: aluminum layer 102D; glass composite layer 104D adjacent to aluminum layer 102D; and carbon composite layer 106D adjacent to glass composite layer 104D, and opposite to aluminum layer 102D. Carbon composite layer 106D may comprise a plurality of carbon composite sublayers 106D1, 106D2, 106D3, 106D4 (e.g., 106D1, 106D2, ..., 106Dn). The number (n) of carbon composite sublayers may be, for example, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, or more sublayers (e.g., 8, 16, 24, 32, 40, or 64 sublayers).

Aluminum layer 102D, glass composite layer 104D, and carbon composite layer 106D may have the same or different thicknesses. Similarly, plurality of carbon composite sublayers 106D1, 106D2, 106D3, 106D4 may have the same or different thicknesses.

Figure 1E:
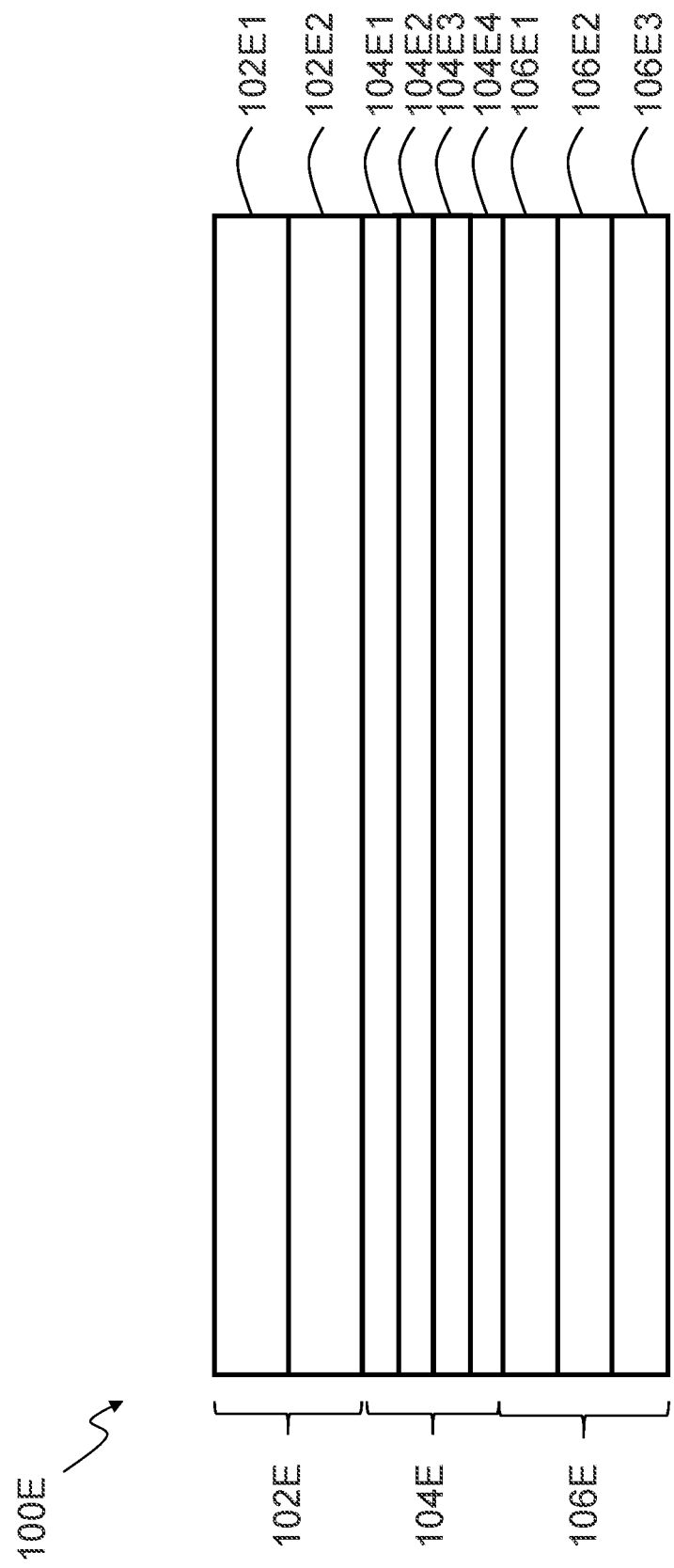
FIG. 1E shows a material system, according to some examples of the disclosed material systems.

FIG. 1E shows material system 100E, according to some examples of the disclosed material systems. As shown in FIG. 1E, material system 100E comprises: aluminum layer 102E; glass composite layer 104E adjacent to aluminum layer 102E; and carbon composite layer 106E adjacent to glass composite layer 104E, and opposite to aluminum layer 102E. Aluminum layer 102E may comprise a plurality of aluminum sublayers 102E1, 102E2 (e.g., 102E1, 102E2, ..., 102En). The number (n) of aluminum sublayers may be, for example, 2, 3, 4, 5, 6, or more sublayers. Glass composite layer 104E may comprise a plurality of glass composite sublayers 104E1, 104E2, 104E3, 104E4 (e.g., 104E1, 104E2, ..., 104Eo). The number (o) of glass composite sublayers may be, for example, 2, 3, 4, 5, 6, 7, 8, 9, 10, 11, 12, or more sublayers. Carbon composite layer 106E may comprise a plurality of carbon composite sublayers 106E1, 106E2, 106E3 (e.g., 106E1, 106E2, ..., 106Ep). The number (p) of carbon composite sublayers may be, for example, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, or more sublayers (e.g., 8, 16, 24, 32, 40, or 64 sublayers).

The number of aluminum sublayers may be the same as or different from the number of glass composite sublayers. The number of aluminum sublayers may be the same as or different from the number of carbon composite sublayers. The number of glass composite sublayers may be the same as or different from the number of carbon composite sublayers.

Aluminum layer 102E, glass composite layer 104E, and carbon composite layer 106E may have the same or different thicknesses. Plurality of plurality of aluminum sublayers 102E1, 102E2 may have the same or different thicknesses. Plurality of glass composite sublayers 104E1, 104E2, 104E3, 104E4 may have the same or different thicknesses. Plurality of carbon composite sublayers 106E1, 106E2, 106E3 may have the same or different thicknesses.

The glass composite layer (e.g., glass composite layer 104A, 104B, 104C, 104D, 104E) may comprise first thermoplastic resin. The first thermoplastic resin may comprise PEEK. The first thermoplastic resin may comprise PEKK. The first thermoplastic resin may comprise one or more of PAEK, PEI, or PPS. The first thermoplastic resin may comprise, for example, one or more of PAEK, PEEK, PEEKK, PEI, PEK, PEKEKK, PEKK, or PPS. The carbon composite layer (e.g., carbon composite layer 106A, 106B, 106C, 106D, 106E) may comprise second thermoplastic resin. The second thermoplastic resin may comprise PEEK. The second thermoplastic resin may comprise PEKK. The second thermoplastic resin may comprise one or more of PAEK, PEI, or PPS. The second thermoplastic resin may comprise, for example, one or more of PAEK, PEEK, PEEKK, PEI, PEK, PEKEKK, PEKK, or PPS. The first thermoplastic resin may be the same as the second thermoplastic resin. The first thermoplastic resin may differ from the second thermoplastic resin.

The first thermoplastic resin may bond the glass composite layer and the carbon composite layer (e.g., glass composite layer 104A and carbon composite layer 106A). The second thermoplastic resin may bond the glass composite layer and the carbon composite layer (e.g., glass composite layer 104A and carbon composite layer 106A). The first and second thermoplastic resins may bond the glass composite layer and the carbon composite layer (e.g., glass composite layer 104A and carbon composite layer 106A).

FIG. 2A shows material system 200A, according to some examples of the disclosed material systems. As shown in FIG. 2A, material system 200A comprises: first aluminum layer 202A; first glass composite layer 204A adjacent to first aluminum layer 202A; first carbon composite layer 206A adjacent to first glass composite layer 204A, and opposite to first aluminum layer 202A; and second glass composite layer 208A adjacent to first carbon composite layer 206A, and opposite to first glass composite layer 204A.

Second glass composite layer 208A may comprise a plurality of second glass composite sublayers (not shown). The number of second glass composite sublayers may be, for example, 2, 3, 4, 5, 6, 7, 8, 9, 10, 11, 12, or more sublayers. Each or all of the sublayers may comprise one or more glass-fiber-reinforced thermoplastic prepreg plies.

First glass composite layer 204A may comprise one or more first glass-fiber-reinforced thermoplastic prepreg plies which, in turn, may comprise first thermoplastic resin. First carbon composite layer 206A may comprise one or more first carbon-fiber-reinforced thermoplastic prepreg plies which, in turn, may comprise second thermoplastic resin. Second glass composite layer 208A may comprise one or more second glass-fiber-reinforced thermoplastic prepreg plies which, in turn, may comprise third thermoplastic resin. The first thermoplastic resin may be the same as or differ from the second thermoplastic resin. The first thermoplastic resin may be the same as or differ from the third thermoplastic resin. The second thermoplastic resin may be the same as or differ from the third thermoplastic resin.

The first thermoplastic resin may comprise PEEK. The first thermoplastic resin may comprise PEKK. The first thermoplastic resin may comprise one or more of PAEK, PEI, or PPS. The first thermoplastic resin may comprise, for example, one or more of PAEK, PEEK, PEEKK, PEI, PEK, PEKEKK, PEKK, or PPS. The second thermoplastic resin may comprise PEEK. The second thermoplastic resin may comprise PEKK. The second thermoplastic resin may comprise one or more of PAEK, PEI, or PPS. The second thermoplastic resin may comprise, for example, one or more of PAEK, PEEK, PEEKK, PEI, PEK, PEKEKK, PEKK, or PPS. The third thermoplastic resin may comprise PEEK. The third thermoplastic resin may comprise PEKK. The third thermoplastic resin may comprise one or more of PAEK, PEI, or PPS. The third thermoplastic resin may comprise, for example, one or more of PAEK, PEEK, PEEKK, PEI, PEK, PEKEKK, PEKK, or PPS.

FIG. 2B shows material system 200B, according to some examples of the disclosed material systems. As shown in FIG. 2B, material system 200B comprises: first aluminum layer 202B; first glass composite layer 204B adjacent to first aluminum layer 202B; first carbon composite layer 206B adjacent to first glass composite layer 204B, and opposite to first aluminum layer 202B; second glass composite layer 208B adjacent to first carbon composite layer 206B, and opposite to first glass composite layer 204B; and second aluminum layer 210B adjacent to second glass composite layer 208B, and opposite to first carbon composite layer 206B.

Second aluminum layer 210B may comprise a plurality of second aluminum sublayers (not shown). The number of second aluminum sublayers may be, for example, 2, 3, 4, 5, 6, or more sublayers.

Figure 2C:
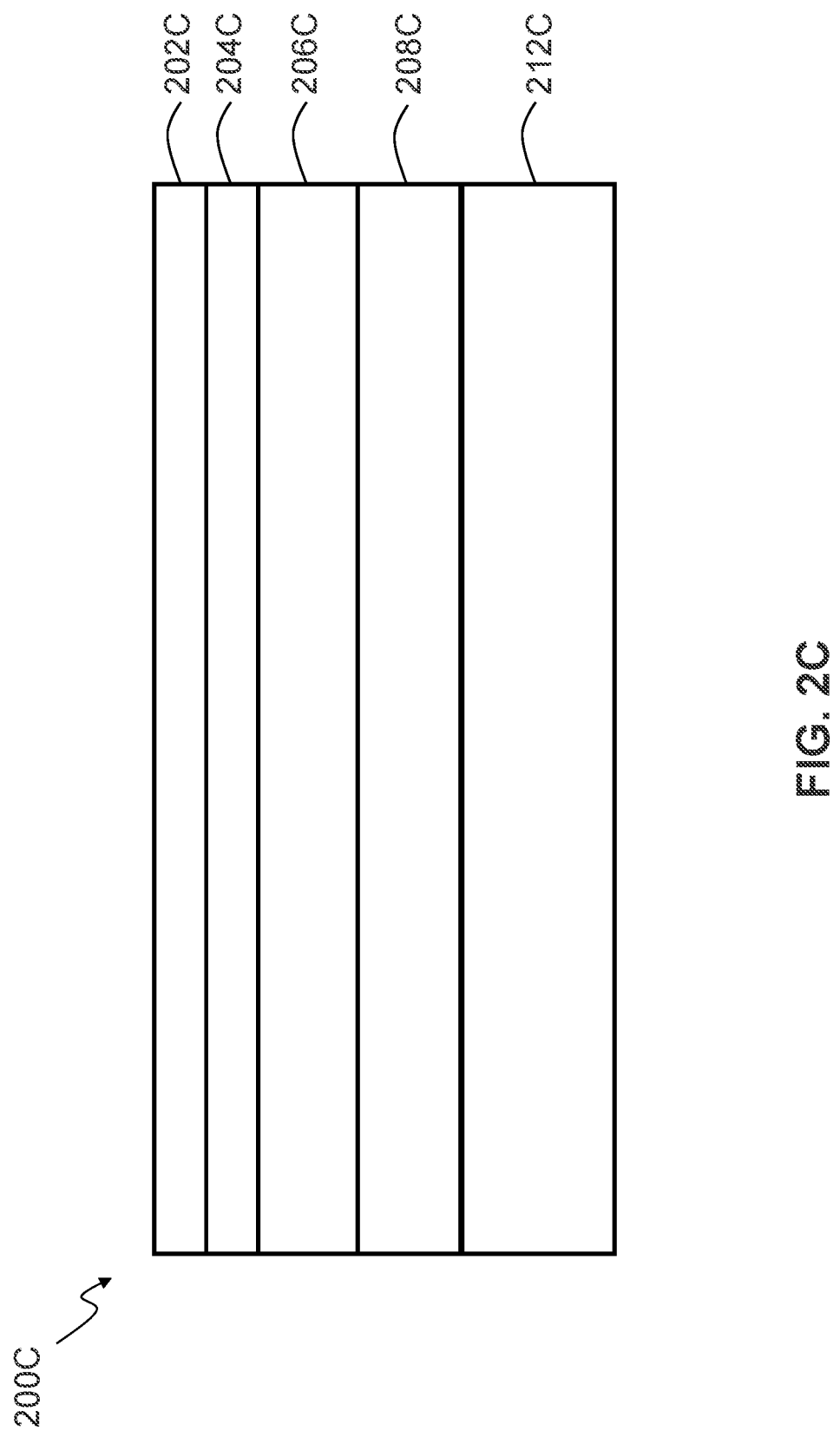
FIG. 2C shows a material system, according to some examples of the disclosed material systems.

FIG. 2C shows material system 200C, according to some examples of the disclosed material systems. As shown in FIG. 2C, material system 200C comprises: first aluminum layer 202C; first glass composite layer 204C adjacent to first aluminum layer 202C; first carbon composite layer 206C adjacent to first glass composite layer 204C, and opposite to first aluminum layer 202C; second glass composite layer 208C adjacent to first carbon composite layer 206C, and opposite to first glass composite layer 204C; and second carbon composite layer 212C adjacent to second glass composite layer 208C, and opposite to first carbon composite layer 206C.

Second carbon composite layer 212C may comprise a plurality of second carbon composite sublayers (not shown). The number of second carbon composite sublayers may be, for example, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, or more sublayers (e.g., 8, 16, 24, 32, 40, or 64 sublayers). Each or all of the sublayers may comprise one or more carbon-fiber-reinforced thermoplastic prepreg plies.

First glass composite layer 204C may comprise one or more first glass-fiber-reinforced thermoplastic prepreg plies which, in turn, may comprise first thermoplastic resin. First carbon composite layer 206C may comprise one or more first carbon-fiber-reinforced thermoplastic prepreg plies which, in turn, may comprise second thermoplastic resin. Second glass composite layer 208C may comprise one or more second glass-fiber-reinforced thermoplastic prepreg plies which, in turn, may comprise third thermoplastic resin. Second carbon composite layer 212C may comprise one or more second carbon-fiber-reinforced thermoplastic prepreg plies which, in turn, may comprise fourth thermoplastic resin. The first thermoplastic resin may be the same as or differ from the second thermoplastic resin. The first thermoplastic resin may be the same as or differ from the third thermoplastic resin. The first thermoplastic resin may be the same as or differ from the fourth thermoplastic resin. The second thermoplastic resin may be the same as or differ from the third thermoplastic resin. The second thermoplastic resin may be the same as or differ from the fourth thermoplastic resin. The third thermoplastic resin may be the same as or differ from the fourth thermoplastic resin.

The first thermoplastic resin may comprise PEEK. The first thermoplastic resin may comprise PEKK. The first thermoplastic resin may comprise one or more of PAEK, PEI, or PPS. The first thermoplastic resin may comprise, for example, one or more of PAEK, PEEK, PEEKK, PEI, PEK, PEKEKK, PEKK, or PPS. The second thermoplastic resin may comprise PEEK. The second thermoplastic resin may comprise PEKK. The second thermoplastic resin may comprise one or more of PAEK, PEI, or PPS. The second thermoplastic resin may comprise, for example, one or more of PAEK, PEEK, PEEKK, PEI, PEK, PEKEKK, PEKK, or PPS. The third thermoplastic resin may comprise PEEK. The third thermoplastic resin may comprise PEKK. The third thermoplastic resin may comprise one or more of PAEK, PEI, or PPS. The third thermoplastic resin may comprise, for example, one or more of PAEK, PEEK, PEEKK, PEI, PEK, PEKEKK, PEKK, or PPS. The fourth thermoplastic resin may comprise PEEK. The fourth thermoplastic resin may comprise PEKK. The fourth thermoplastic resin may comprise one or more of PAEK, PEI, or PPS. The fourth thermoplastic resin may comprise, for example, one or more of PAEK, PEEK, PEEKK, PEI, PEK, PEKEKK, PEKK, or PPS.

FIG. 2D shows material system 200D, according to some examples of the disclosed material systems. As shown in FIG. 2D, material system 200D may comprise: first aluminum layer 202D; first glass composite layer 204D adjacent to first aluminum layer 202D; first carbon composite layer 206D adjacent to first glass composite layer 204D, and opposite to first aluminum layer 202D; second glass composite layer 208D adjacent to first carbon composite layer 206D, and opposite to first glass composite layer 204D; second aluminum layer 210D adjacent to second glass composite layer 208D, and opposite to first carbon composite layer 206D; third glass composite layer 214D adjacent to second aluminum layer 210D, and opposite to second glass composite layer 208D; second carbon composite layer 216D adjacent to third glass composite layer 214D, and opposite to second aluminum layer 210D; fourth glass composite layer 218D adjacent to second carbon composite layer 216D, and opposite to third glass composite layer 214D; and/or third aluminum layer 220D adjacent to fourth glass composite layer 218D, and opposite to second carbon composite layer 216D.

Each of the aluminum layers may comprise a plurality of aluminum sublayers (not shown). The number of aluminum sublayers may be, for example, 2, 3, 4, 5, 6, or more sublayers. Each of the glass composite layers may comprise a plurality of glass composite sublayers (not shown). The number of glass composite sublayers may be, for example, 2, 3, 4, 5, 6, 7, 8, 9, 10, 11, 12, or more sublayers. Each of the carbon composite layers may comprise a plurality of carbon composite sublayers (not shown). The number of carbon composite sublayers may be, for example, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, or more sublayers (e.g., 8, 16, 24, 32, 40, or 64 sublayers).

Each or all of the glass composite layers may comprise one or more glass-fiber-reinforced thermoplastic prepreg plies which, in turn, may comprise first thermoplastic resin. The first thermoplastic resin may comprise PEEK. The first thermoplastic resin may comprise PEKK. The first thermoplastic resin may comprise one or more of PAEK, PEI, or PPS. The first thermoplastic resin may comprise one or more of PAEK, PEEK, PEEKK, PEI, PEK, PEKEKK, PEKK, or PPS. The first thermoplastic resin may be the same as or differ from the thermoplastic resin in any other glass or carbon composite layer(s).

Each or all of the carbon composite layers may comprise one or more carbon-fiber-reinforced thermoplastic prepreg plies which, in turn, may comprise second thermoplastic resin. In each or all of the carbon composite layers, the second thermoplastic resin may comprise PEEK. In each or all of the carbon composite layers, the second thermoplastic resin may comprise PEKK. In each or all of the carbon composite layers, the second thermoplastic resin may comprise one or more of PAEK, PEI, or PPS. In each or all of the carbon composite layers, the second thermoplastic resin may comprise one or more of PAEK, PEEK, PEEKK, PEI, PEK, PEKEKK, PEKK, or PPS. In each of the carbon composite layers, the second thermoplastic resin may be the same as or differ from the thermoplastic resin in any other carbon or glass composite layer(s).

Figure 2E:
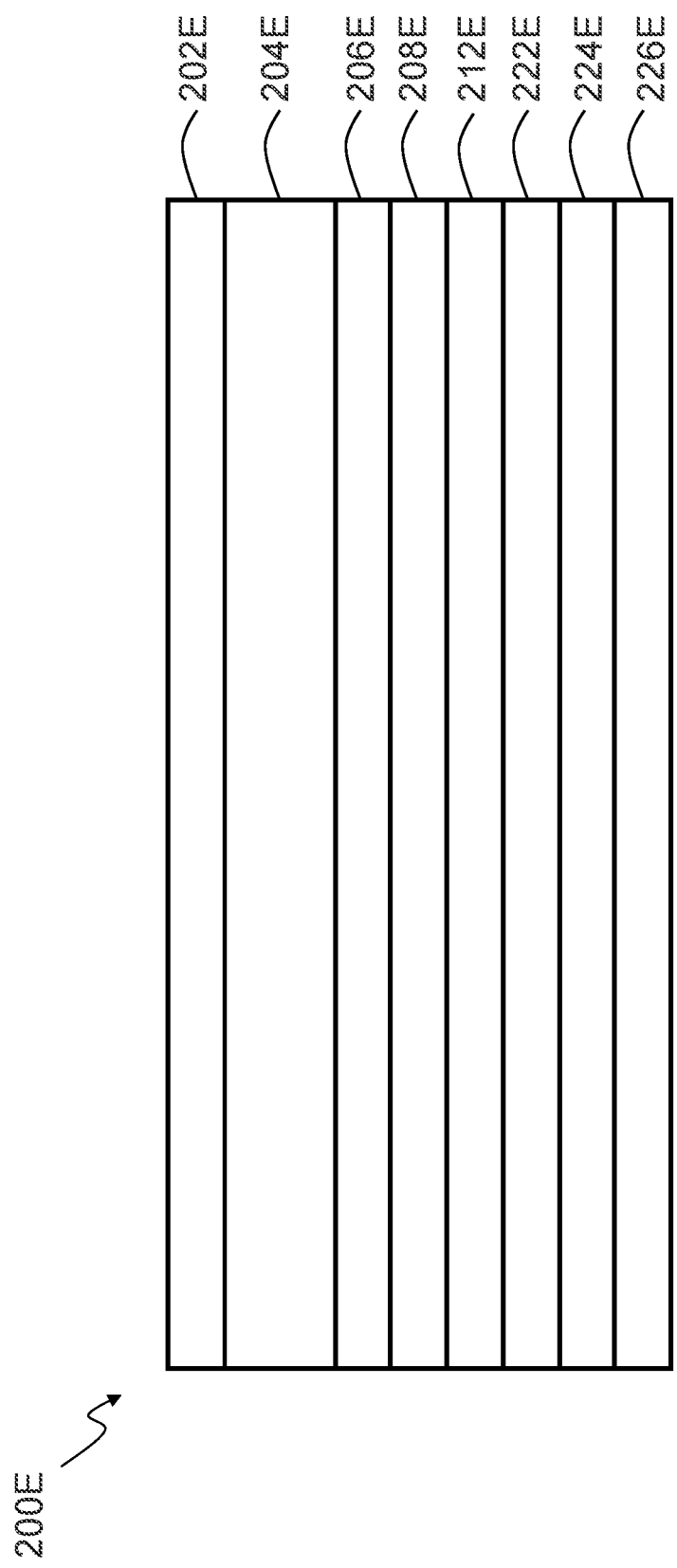
FIG. 2E shows a material system, according to some examples of the disclosed material systems.

FIG. 2E shows material system 200E, according to some examples of the disclosed material systems. As shown in FIG. 2E, material system 200E may comprise: first aluminum layer 202E; first glass composite layer 204E adjacent to first aluminum layer 202E; first carbon composite layer 206E adjacent to first glass composite layer 204E, and opposite to first aluminum layer 202E; second glass composite layer 208E adjacent to first carbon composite layer 206E, and opposite to first glass composite layer 204E; second carbon composite layer 212E adjacent to second glass composite layer 208E, and opposite to first carbon composite layer 206E; third glass composite layer 222E adjacent to second carbon composite layer 212E, and opposite to second glass composite layer 208E; third carbon composite layer 224E adjacent to third glass composite layer 222E, and opposite to second carbon composite layer 212E; and/or fourth glass composite layer 226E adjacent to third carbon composite layer 224E, and opposite to third glass composite layer 222E.

First aluminum layer 202E may comprise a plurality of first aluminum sublayers (not shown). The number of first aluminum sublayers may be, for example, 2, 3, 4, 5, 6, or more sublayers. Each of the glass composite layers may comprise a plurality of glass composite sublayers (not shown). The number of glass composite sublayers may be, for example, 2, 3, 4, 5, 6, 7, 8, 9, 10, 11, 12, or more sublayers. Each of the carbon composite layers may comprise a plurality of carbon composite sublayers (not shown). The number of carbon composite sublayers may be, for example, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, or more sublayers (e.g., 8, 16, 24, 32, 40, or 64 sublayers).

Each or all of the glass composite layers may comprise one or more glass-fiber-reinforced thermoplastic prepreg plies which, in turn, may comprise first thermoplastic resin. In each or all of the glass composite layers, the first thermoplastic resin may comprise PEEK. In each or all of the glass composite layers, the first thermoplastic resin may comprise PEKK. In each or all of the glass composite layers, the first thermoplastic resin may comprise one or more of PAEK, PEI, or PPS. In each or all of the glass composite layers, the first thermoplastic resin may comprise one or more of PAEK, PEEK, PEEKK, PEI, PEK, PEKEKK, PEKK, or PPS. In each of the glass composite layers, the first thermoplastic resin may be the same as or differ from the thermoplastic resin in any other glass or carbon composite layer(s).

Each or all of the carbon composite layers may comprise one or more carbon-fiber-reinforced thermoplastic prepreg plies which, in turn, may comprise second thermoplastic resin. In each or all of the carbon composite layers, the second thermoplastic resin may comprise PEEK. In each or all of the carbon composite layers, the second thermoplastic resin may comprise PEKK. In each or all of the carbon composite layers, the second thermoplastic resin may comprise one or more of PAEK, PEI, or PPS. In each or all of the carbon composite layers, the second thermoplastic resin may comprise one or more of PAEK, PEEK, PEEKK, PEI, PEK, PEKEKK, PEKK, or PPS. In each of the carbon composite layers, the second thermoplastic resin may be the same as or differ from the thermoplastic resin in any other carbon or glass composite layer(s).

Figure 3A:
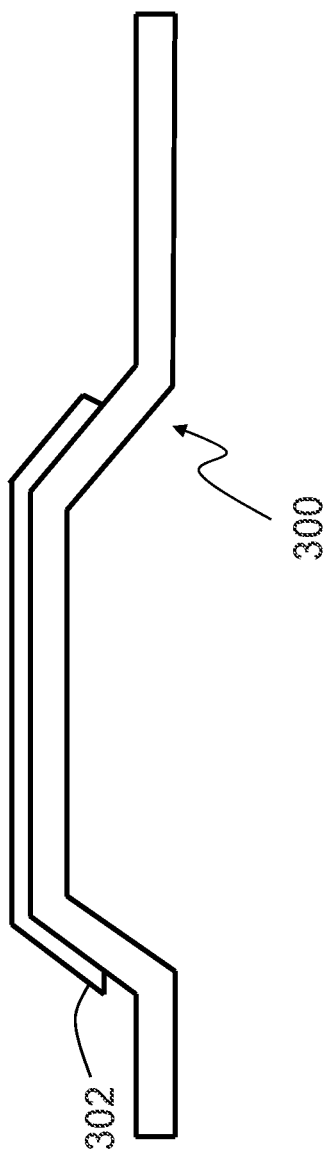
FIG. 3A shows laying up a first layer on a mold tool, according to some examples of the disclosed material systems.

FIG. 3A shows laying up a first layer on a mold tool (e.g., a mandrel), according to some examples of the disclosed material systems. As shown in FIG. 3A, first layer 302 may be laid up on mold tool 300. Mold tool 300 may be of substantially any shape. First layer 302 may comprise, for example, an aluminum layer, a glass composite layer, or a carbon composite layer. To facilitate subsequent removal of a material system from mold tool 300, a parting film or similar may be used between mold tool 300 and first layer 302. First layer 302 may comprise two or more sublayers (not shown).

Figure 3B:
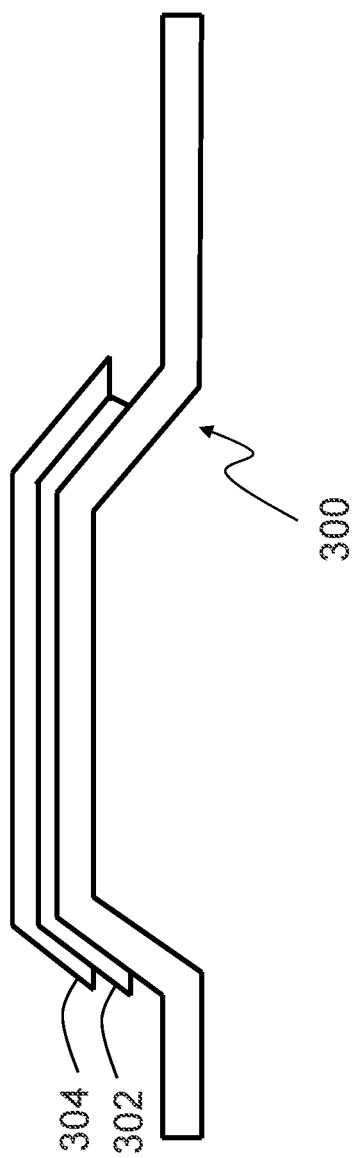
FIG. 3B shows laying up a second layer on the first layer of FIG. 3A, according to some examples of the disclosed material systems.

FIG. 3B shows laying up a second layer on the first layer of FIG. 3A, according to some examples of the disclosed material systems. As shown in FIG. 3B, second layer 304 may be laid up on first layer 302 to form a first portion of stack 318 (see FIG. 3D). Second layer 304 may comprise, for example, an aluminum layer, a glass composite layer, or a carbon composite layer, provided that an aluminum layer does not directly contact a carbon composite layer (due to galvanic corrosion concerns). Second layer 304 may comprise two or more sublayers (not shown). The shape of second layer 304 may be the same as or differ from the shape of first layer 302. The thickness of second layer 304 may be the same as or differ from the thickness of first layer 302.

Stack 318 may include an additional layer (not shown) between first layer 302 and second layer 304. The additional layer may improve the bonding of first layer 302 and second layer 304. The additional layer may be, for example, an adhesive layer. In such cases, second layer 304 may be adjacent to first layer 302, but may not directly contact first layer 302. Care should be taken during selection of material(s) for such an additional layer because, for example, some material(s) comprise elements or compounds that may interact with first layer 302 and/or second layer 304 via one or more interaction mechanisms.

Figure 3C:
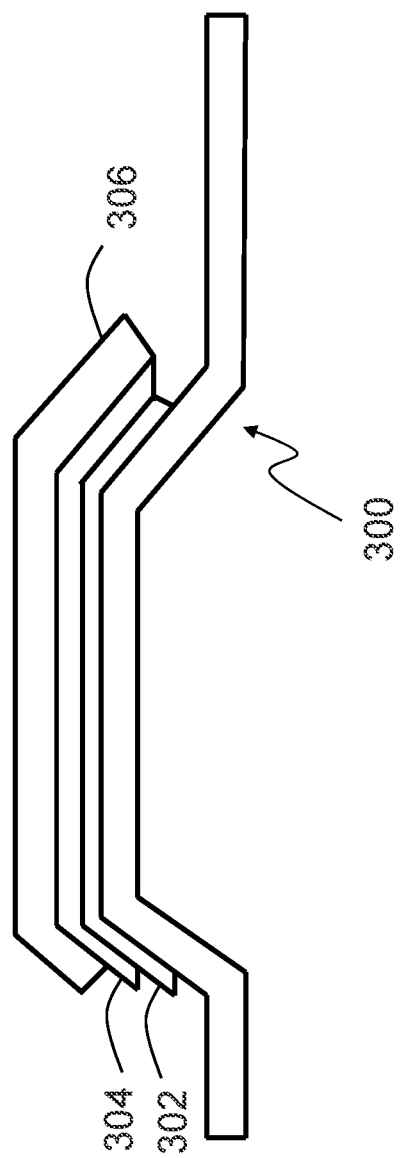
FIG. 3C shows laying up a third layer on the second layer of FIG. 3B, according to some examples of the disclosed material systems.

FIG. 3C shows laying up a third layer on the second layer of FIG. 3B, according to some examples of the disclosed material systems. As shown in FIG. 3C, third layer 306 may be laid up on second layer 304 to form a second portion of stack 318. Third layer 306 may comprise, for example, an aluminum layer, a glass composite layer, or a carbon composite layer, as long as an aluminum layer does not directly contact a carbon composite layer (due to galvanic corrosion concerns). Third layer 306 may comprise two or more sublayers (not shown). The shape of third layer 306 may be the same as or differ from the shape of first layer 302. The thickness of third layer 306 may be the same as or differ from the thickness of first layer 302. The shape of third layer 306 may be the same as or differ from the shape of second layer 304. The thickness of third layer 306 may be the same as or differ from the thickness of second layer 304.

Stack 318 may include an additional layer (not shown) between second layer 304 and third layer 306. The additional layer may improve the bonding of second layer 304 and third layer 306. The additional layer may be, for example, an adhesive layer. In such cases, third layer 306 may be adjacent to second layer 304, but may not directly contact second layer 304. Care should be taken during selection of material(s) for such an additional layer because, for example, some material(s) comprise elements or compounds that may interact with second layer 304 and/or third layer 306 via one or more interaction mechanisms.

In addition to addressing galvanic corrosion concerns, a glass composite layer also may function as a compliant layer, reducing strain within and/or stress between layers adjacent to the glass composite layer (e.g., an aluminum layer on one side and a carbon fiber layer on the other). Such a compliant layer may at least partially decouple effects (e.g., thermal contraction, thermal expansion, strains, or stresses) associated with the layers adjacent to the glass composite layer, and/or reduce strain within and/or stress between layers through effects associated with orientation of glass fibers in the glass composite layer(s).

The addition of layers may continue until a desired stacking of layers is achieved. The laying up may be done manually and/or automatically.

Surfaces of the aluminum layer may undergo surface preparation, such as alkaline degreasing, chromic acid anodizing or other anodizing processing, priming (e.g., with BR 127 corrosion-inhibiting primer), sol-gel, and/or pickling in chromic-sulfuric acid. The surfaces also may be roughened, for example, by abrasion.

Stack 318 may be bagged (e.g., vacuum bag) on the mold tool (e.g., a mandrel).

The stacking and consolidating may use stationary compression molding (e.g., autoclave) or continuous compression molding (e.g., out-of-autoclave or vacuum-bag-only).

Figure 3D:
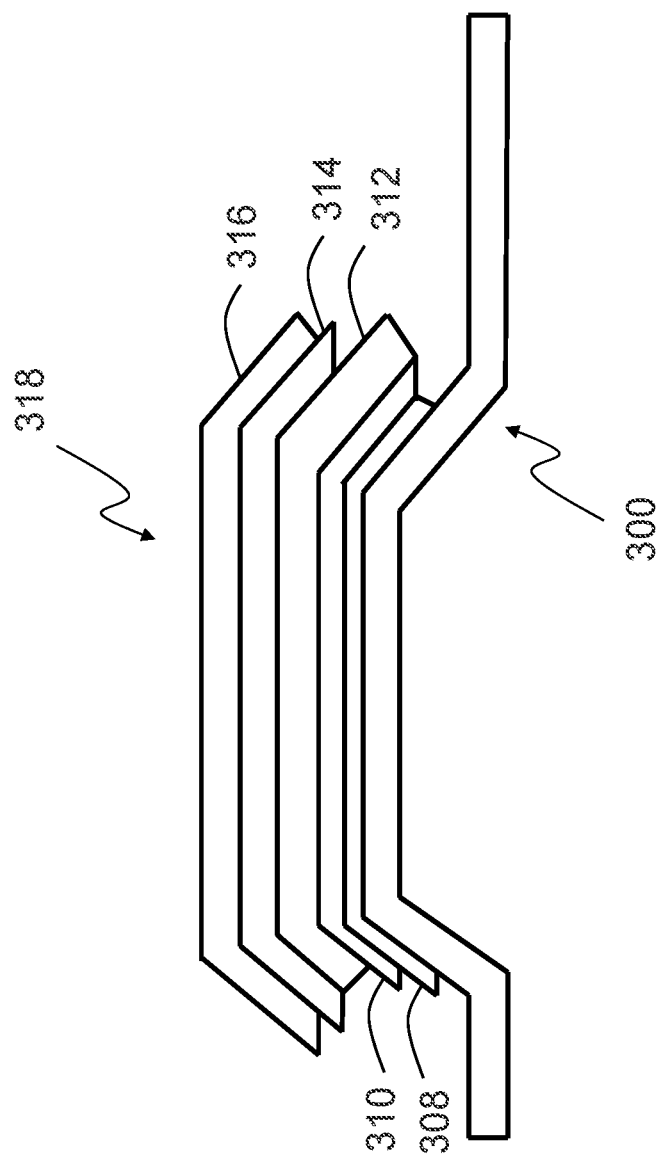
FIG. 3D shows a stack comprising a first carbon composite layer, a first glass composite layer, a second carbon composite layer, a second glass composite layer, and/or an aluminum layer, according to some examples of the disclosed material systems.

FIG. 3D shows stack 318 comprising a first carbon composite layer, a first glass composite layer, a second carbon composite layer, a second glass composite layer, and/or an aluminum layer, according to some examples of the disclosed material systems. As shown in FIG. 3D, first carbon composite layer 308 may be laid up on mold tool 300, first glass composite layer 310 may be laid up on first carbon composite layer 308, second carbon composite layer 312 may be laid up on first glass composite layer 310, second glass composite layer 314 may be laid up on second carbon composite layer 312, and/or aluminum layer 316 may be laid up on second glass composite layer 314 to achieve stack 318.

First glass composite layer 310 may be adjacent to first carbon composite layer 308, second carbon composite layer 312 may be adjacent to first glass composite layer 310, second glass composite layer 314 may be adjacent to second carbon composite layer 312, and/or aluminum layer 316 may be adjacent to second glass composite layer 314.

One or more of first carbon composite layer 308, first glass composite layer 310, second carbon composite layer 312, second glass composite layer 314, or aluminum layer 316 may comprise two or more sublayers (not shown).

Stack 318 may include additional layer(s) (not shown) between first carbon composite layer 308 and first glass composite layer 310; between first glass composite layer 310 and second carbon composite layer 312; between second carbon composite layer 312 and second glass composite layer 314; and/or between second glass composite layer 314 and aluminum layer 316. The additional layers may improve the bonding of associated adjacent layers. The additional layer(s) may be, for example, adhesive layer(s). In such cases, layers may be adjacent to each other, but may not directly contact each other. Care should be taken during selection of material(s) for such additional layer(s) because, for example, some material(s) comprise elements or compounds that may interact with other layers via one or more interaction mechanisms.

One or both of first glass composite layer 310 or second glass composite layer 314 may comprise one or more thermoplastic prepreg plies. The one or more thermoplastic prepreg plies may be consolidated at a temperature sufficient to soften aluminum layer 316. The consolidating of the one or more thermoplastic prepreg plies may be conducted, for example, in an autoclave.

The consolidating of the one or more thermoplastic prepreg plies of one or both of first glass composite layer 310 or second glass composite layer 314 comprises raising a temperature of the one or more thermoplastic prepreg plies to ≥600° F., ≥650° F., ≥675° F., or ≥700° F. (e.g., 707° F.±9° F. or 710° F.±10° F.); raising a pressure of the one or more thermoplastic prepreg plies to ≥50 psig, ≥100 psig, ≥150 psig, ≥200 psig, ≥250 psig, or ≤300 psig (e.g., 100 psig±5 psig or 290 psig minimum); and/or holding the temperature and pressure for ≥5 minutes, ≥10 minutes, ≥15 minutes, or ≥20 minutes (e.g., 20 minutes+15 minutes/−5 minutes). For example, the temperature of the one or more thermoplastic prepreg plies may be raised to 710° F.±10° F., the pressure adjusted to 100 psig±5 psig, and then the temperature and pressure may be held within those ranges for 20 minutes+15 minutes/−5 minutes. For example, the temperature of the one or more thermoplastic prepreg plies may be raised to 707° F.±9° F., the pressure adjusted to 290 psig minimum, and then the temperature and pressure may be held within those temperature and pressure ranges for 6 minutes minimum.

The consolidating of the one or more thermoplastic prepreg plies of one or both of first glass composite layer 310 or second glass composite layer 314 comprises raising a temperature of stack 318 to ≥600° F., ≥650° F., ≥675° F., or ≥700° F. (e.g., 707° F.±9° F. or 710° F.±10° F.); raising a pressure of stack 318 to ≥50 psig, ≥100 psig, ≥150 psig, ≥200 psig, ≥250 psig, or ≤300 psig (e.g., 100 psig±5 psig or 290 psig minimum); and/or holding the temperature and pressure for ≥5 minutes, ≥10 minutes, ≥15 minutes, or ≥20 minutes (e.g., 20 minutes+15 minutes/−5 minutes). For example, the temperature of stack 318 may be raised to 710° F.±10° F., the pressure adjusted to 100 psig±5 psig, and then the temperature and pressure may be held within those temperature and pressure ranges for 20 minutes+15 minutes/−5 minutes. For example, the temperature of stack 318 may be raised to 707° F.±9° F., the pressure adjusted to 290 psig minimum, and then the temperature and pressure may be held within those temperature and pressure ranges for 6 minutes minimum.

One or both of first carbon composite layer 308 or second carbon composite layer 312 may comprise one or more thermoplastic prepreg plies. The one or more thermoplastic prepreg plies may be consolidated at a temperature sufficient to soften aluminum layer 316. The consolidating of the one or more thermoplastic prepreg plies may be conducted, for example, in an autoclave.

The consolidating of the one or more thermoplastic prepreg plies of one or both of first carbon composite layer 308 or second carbon composite layer 312 comprises raising a temperature of the one or more thermoplastic prepreg plies to ≥600° F., ≥650° F., ≥675° F., or ≥700° F. (e.g., 707° F.±9° F. or 710° F.±10° F.); raising a pressure of the one or more thermoplastic prepreg plies to ≥50 pounds per square inch gage ("psig"), ≥100 psig, ≥150 psig, ≥200 psig, ≥250 psig, or ≤300 psig (e.g., 100 psig±5 psig or 290 psig minimum); and/or holding the temperature and pressure for ≥5 minutes, ≥10 minutes, ≥15 minutes, or ≥20 minutes (e.g., 20 minutes+15 minutes/−5 minutes). For example, the temperature of the one or more thermoplastic prepreg plies may be raised to 710° F.±10° F., the pressure adjusted to 100 psig±5 psig, and then the temperature and pressure may be held within those ranges for 20 minutes+15 minutes/−5 minutes. For example, the temperature of the one or more thermoplastic prepreg plies may be raised to 707° F.±9° F., the pressure adjusted to 290 psig minimum, and then the temperature and pressure may be held within those temperature and pressure ranges for 6 minutes minimum.

The consolidating of the one or more thermoplastic prepreg plies of one or both of first carbon composite layer 308 or second carbon composite layer 312 comprises raising a temperature of stack 318 to 600° F., ≥650° F., ≥675° F., or ≥700° F. (e.g., 707° F.±9° F. or 710° F.±10° F.); raising a pressure of stack 318 to ≥50 psig, ≥100 psig, ≥150 psig, ≥200 psig, ≥250 psig, or ≤300 psig (e.g., 100 psig±5 psig or 290 psig minimum); and/or holding the temperature and pressure for ≥5 minutes, ≥10 minutes, ≥15 minutes, or ≥20 minutes (e.g., 20 minutes+15 minutes/−5 minutes). For example, the temperature of stack 318 may be raised to 710° F.±10° F., the pressure adjusted to 100 psig±5 psig, and then the temperature and pressure may be held within those temperature and pressure ranges for 20 minutes+15 minutes/−5 minutes. For example, the temperature of stack 318 may be raised to 707° F.±9° F., the pressure adjusted to 290 psig minimum, and then the temperature and pressure may be held within those temperature and pressure ranges for 6 minutes minimum.

Such thermoplastic prepreg plies may be produced in advance and stored, for example, on rolls with backing paper. Prepreg tapes for thermoplastic prepreg plies, if unidirectional, may be produced, for example, by extrusion or pultrusion.

The thermoplastic prepreg plies may be dried (e.g., in an oven) prior to consolidation. For example, the thermoplastic prepreg plies may be dried at 250° F. for a minimum of 10 hours prior to consolidation.

One or both of first glass composite layer 310 or second glass composite layer 314 may comprise first thermoplastic resin. The temperature and pressure of stack 318 may be adjusted so as to consolidate stack 318 when manufacturing a material system. The adjusting of the temperature and pressure of stack 318 comprises raising a temperature of the first thermoplastic resin to ≥600° F., ≥650° F., ≥675° F., or ≥700° F. (e.g., 707° F.±9° F. or 710° F.±10° F.); raising a pressure of the first thermoplastic resin to ≥50 psig, ≥100 psig, ≥150 psig, ≥200 psig, ≥250 psig, or ≥300 psig (e.g., 100 psig±5 psig or 290 psig minimum); and/or holding the temperature and pressure for ≥5 minutes, ≥10 minutes, ≥15 minutes, or ≥20 minutes (e.g., 20 minutes+15 minutes/−5 minutes). For example, the temperature of the first thermoplastic resin may be raised to 710° F.±10° F., the pressure adjusted to 100 psig±5 psig, and then the temperature and pressure may be held within those ranges for 20 minutes+15 minutes/−5 minutes. For example, the temperature of the first thermoplastic resin may be raised to 707° F.±9° F., the pressure adjusted to 290 psig minimum, and then the temperature and pressure may be held within those temperature and pressure ranges for 6 minutes minimum.

One or both of first carbon composite layer 308 or second carbon composite layer 312 may comprise second thermoplastic resin. The temperature and pressure of the second thermoplastic resin may be adjusted so as to consolidate stack 318 when manufacturing a material system. The adjusting of the temperature and pressure of stack 318 comprises raising a temperature of the second thermoplastic resin to ≥600° F., ≥650° F., ≥675° F., or ≥700° F. (e.g., 707° F.±9° F. or 710° F.±10° F.); raising a pressure of the second thermoplastic resin to ≥50 psig, ≥100 psig, ≥150 psig, ≥200 psig, ≥250 psig, or ≤300 psig (e.g., 100 psig±5 psig or 290 psig minimum); and/or holding the temperature and pressure for ≥5 minutes, ≥10 minutes, ≥15 minutes, or ≥20 minutes (e.g., 20 minutes+15 minutes/−5 minutes). For example, the temperature of the second thermoplastic resin may be raised to 710° F.±10° F., the pressure adjusted to 100 psig±5 psig, and then the temperature and pressure may be held within those ranges for 20 minutes+15 minutes/−5 minutes. For example, the temperature of the second thermoplastic resin may be raised to 707° F.±9° F., the pressure adjusted to 290 psig minimum, and then the temperature and pressure may be held within those temperature and pressure ranges for 6 minutes minimum.

A temperature versus time profile for consolidating the one or more thermoplastic prepreg plies at a temperature sufficient to soften aluminum layer 316, or for adjusting the temperature and pressure of stack 318 so as to consolidate stack 318 may comprise three phases: a heat-up phase (generally positive slope), a hold phase (generally zero slope), and a cooldown phase (generally negative slope). In the heat-up phase, the heat-up rate may take on almost any value (e.g., in ° F./minute). In the hold phase, the temperature and pressure may be held substantially constant within prescribed bands or above prescribed minimums. In the cooldown phase, the cooldown rate (e.g., in ° F./minute) may be limited, for example, by concerns regarding thermally induced stress, crystallinity issues, and/or equipment limitations. In addition or in the alternative, the pressure band may need to be maintained until the temperature is significantly reduced.

FIG. 4A shows a temperature versus time profile for consolidating one or more thermoplastic prepreg plies at a temperature sufficient to soften an aluminum layer, or for adjusting the temperature and pressure of a stack so as to consolidate the stack when manufacturing a material system, according to some examples of the disclosed material systems. As shown in FIG. 4A, in the heat-up phase, the heat-up rate may take on almost any value; in the hold phase, the temperature (e.g., cure temperature) may be held substantially constant within a prescribed band (e.g., 707° F.±9° F. or 710° F.±10° F.); and in the cooldown phase, the cooldown rate may be limited (e.g., ≤100° F./minute) until the temperature is significantly reduced (e.g., until the temperature is ≤250° F.).

FIG. 4B shows a pressure versus time profile for consolidating one or more thermoplastic prepreg plies at a temperature sufficient to soften an aluminum layer, or for adjusting the temperature and pressure of a stack so as to consolidate the stack when manufacturing a material system, according to some examples of the disclosed material systems. As shown in FIG. 4B, in the heat-up phase, the pressure is low; in the hold phase, the pressure may be held substantially constant within a prescribed band (e.g., 100 psig±5 psig for 20 minutes+15 minutes/−5 minutes or 290 psig minimum for 6 minutes minimum); and in the cooldown phase, the pressure band may need to be maintained until the temperature is significantly reduced (e.g., 100 psig±5 psig or 290 psig minimum until the temperature is 250° F.).

As shown in FIG. 4B, the pressure increase to the adjusted pressure and/or the pressure decrease from the adjusted pressure may be relatively rapid. The pressure increase to the adjusted pressure and/or the pressure decrease from the adjusted pressure may be relatively slow, so that the leading and/or trailing edges of the pressure graph have a more gradual slope. The pressure increase to the adjusted pressure and/or the pressure decrease from the adjusted pressure may be conducted in a series of smaller steps.

FIG. 4C shows a temperature and pressure versus time profile for consolidating one or more thermoplastic prepreg plies at a temperature sufficient to soften an aluminum layer, or for adjusting the temperature and pressure of a stack, according to some examples of the disclosed material systems. As shown in FIG. 4C, in the heat-up phase, the heat-up rate may take on almost any value; in the hold phase, the temperature (e.g., cure temperature) and pressure may be held substantially constant within prescribed bands or above prescribed minimums (e.g., 707° F.±9° F. and 290 psig minimum for 6 minutes minimum); and in the cooldown phase, the cooldown rate may be limited (e.g., 108° F./minute) until the temperature is significantly reduced (e.g., until the temperature is 410° F.) and/or the pressure minimum may need to be maintained until the temperature is significantly reduced (e.g., 290 psig minimum until the temperature is 248° F.).

During the heat-up phase, the heat-up may be paused to allow temperatures to stabilize and/or standardize, and then the heat-up may continue (e.g., effectively creating a soaking or pre-consolidation step or steps in the heat-up profile at a dwell temperature, not shown). Similarly, during the cooldown phase, the cooldown may be paused to allow temperatures to stabilize and/or standardize, and then the cooldown may continue (e.g., effectively creating a soaking or post-consolidation step or steps in the cooldown profile, not shown).

Material systems with a variety of component cross-sectional shapes may be produced. The material systems may have, for example, cross-sections that are round and solid (e.g., a rod), round and hollow (e.g., a tube), rectangular and solid, or rectangular and hollow. The material systems may have, for example, cross-sections that resemble blades, hats, and/or the capital letters C, I, L, T, U, or Z.

EXAMPLE 1

A 4-layer stack may comprise: an aluminum layer (layer 1), two glass composite layers (sublayers 2-3 and 12-13), and a carbon composite layer (sublayers 4-11). The carbon composite layer may exhibit quasi-isotropic strength properties. Per the table below, each glass composite layer comprises two sublayers, and the carbon composite layer comprises eight sublayers.

| Layer Number | Layer Composition | Layer Thickness (inches) | Fiber Orientation (degrees) |
| --- | --- | --- | --- |
| 1 | 1100-O Aluminum | 0.0100 | N/A |
| 2 | S-2 glass/PEKK fabric | 0.0035 | ±45 |
| 3 | S-2 glass/PEKK fabric | 0.0035 | ±45 |
| 4 | AS4D carbon/PEKK tape | 0.0055 | −45 |
| 5 | AS4D carbon/PEKK tape | 0.0055 | +45 |
| 6 | AS4D carbon/PEKK tape | 0.0055 | 90 |
| 7 | AS4D carbon/PEKK tape | 0.0055 | 0 |
| 8 | AS4D carbon/PEKK tape | 0.0055 | 0 |
| 9 | AS4D carbon/PEKK tape | 0.0055 | 90 |
| 10 | AS4D carbon/PEKK tape | 0.0055 | +45 |
| 11 | AS4D carbon/PEKK tape | 0.0055 | −45 |
| 12 | S-2 glass/PEKK fabric | 0.0035 | ±45 |
| 13 | S-2 glass/PEKK fabric | 0.0035 | ±45 |
| Total | N/A | 0.0680 | N/A |

EXAMPLE 2

A 4-layer stack may comprise: an aluminum layer (layer 1), two glass composite layers (sublayers 2-3 and 20-21), and a carbon composite layer (sublayers 4-19). The carbon composite layer may exhibit quasi-isotropic strength properties. Per the table below, each glass composite layer comprises two sublayers, and the carbon composite layer comprises sixteen sublayers.

| Layer Number | Layer Composition | Layer Thickness (inches) | Fiber Orientation (degrees) |
| --- | --- | --- | --- |
| 1 | 1100-O Aluminum | 0.0100 | N/A |
| 2 | S-2 glass/PEKK fabric | 0.0025 | ±45 |

-continued

| Layer Number | Layer Composition | Layer Thickness (inches) | Fiber Orientation (degrees) |
|---|---|---|---|
| 3 | S-2 glass/PEKK fabric | 0.0025 | ±45 |
| 4 | AS4D carbon/PEKK tape | 0.0054 | +45 |
| 5 | AS4D carbon/PEKK tape | 0.0054 | 90 |
| 6 | AS4D carbon/PEKK tape | 0.0054 | −45 |
| 7 | AS4D carbon/PEKK tape | 0.0054 | 0 |
| 8 | AS4D carbon/PEKK tape | 0.0054 | +45 |
| 9 | AS4D carbon/PEKK tape | 0.0054 | 0 |
| 10 | AS4D carbon/PEKK tape | 0.0054 | −45 |
| 11 | AS4D carbon/PEKK tape | 0.0054 | 0 |
| 12 | AS4D carbon/PEKK tape | 0.0054 | 0 |
| 13 | AS4D carbon/PEKK tape | 0.0054 | −45 |
| 14 | AS4D carbon/PEKK tape | 0.0054 | 0 |
| 15 | AS4D carbon/PEKK tape | 0.0054 | +45 |
| 16 | AS4D carbon/PEKK tape | 0.0054 | 0 |
| 17 | AS4D carbon/PEKK tape | 0.0054 | −45 |
| 18 | AS4D carbon/PEKK tape | 0.0054 | 90 |
| 19 | AS4D carbon/PEKK tape | 0.0054 | +45 |
| 20 | S-2 glass/PEKK fabric | 0.0025 | ±45 |
| 21 | S-2 glass/PEKK fabric | 0.0025 | ±45 |
| Total | N/A | 0.1064 | N/A |

EXAMPLE 3

A 4-layer stack may comprise: an aluminum layer (layer 1), two glass composite layers (sublayers 2-3 and 12-13), and a carbon composite layer (sublayers 4-11). The carbon composite layer may exhibit quasi-isotropic strength properties. Per the table below, each glass composite layer comprises two sublayers, and the carbon composite layer comprises eight sublayers.

| Layer Number | Layer Composition | Layer Thickness (inches) | Fiber Orientation (degrees) |
|---|---|---|---|
| 1 | 1100-O Aluminum | 0.0100 | N/A |
| 2 | S-2 glass/PEKK fabric | 0.0035 | ±45 |
| 3 | S-2 glass/PEKK fabric | 0.0035 | ±45 |
| 4 | AS4D carbon/PEKK tape | 0.0075 | −45 |
| 5 | AS4D carbon/PEKK tape | 0.0075 | +45 |
| 6 | AS4D carbon/PEKK tape | 0.0075 | 90 |
| 7 | AS4D carbon/PEKK tape | 0.0075 | 0 |
| 8 | AS4D carbon/PEKK tape | 0.0075 | 0 |
| 9 | AS4D carbon/PEKK tape | 0.0075 | 90 |
| 10 | AS4D carbon/PEKK tape | 0.0075 | +45 |
| 11 | AS4D carbon/PEKK tape | 0.0075 | −45 |
| 12 | S-2 glass/PEKK fabric | 0.0035 | ±45 |
| 13 | S-2 glass/PEKK fabric | 0.0035 | ±45 |
| Total | N/A | 0.0840 | N/A |

EXAMPLE 4

A 4-layer stack may comprise: an aluminum layer (layer 1), two glass composite layers (layers 2 and 11), and a carbon composite layer (sublayers 3-10). The carbon composite layer may exhibit quasi-isotropic strength properties. Per the table below, each glass composite layer comprises one layer, and the carbon composite layer comprises eight sublayers.

| Layer Number | Layer Composition | Layer Thickness (inches) | Fiber Orientation (degrees) |
|---|---|---|---|
| 1 | 1100-O Aluminum | 0.0100 | N/A |
| 2 | S-2 glass/PEKK fabric | 0.0035 | ±45 |
| 3 | AS4D carbon/PEKK tape | 0.0075 | −45 |
| 4 | AS4D carbon/PEKK tape | 0.0075 | +45 |
| 5 | AS4D carbon/PEKK tape | 0.0075 | 90 |
| 6 | AS4D carbon/PEKK tape | 0.0075 | 0 |
| 7 | AS4D carbon/PEKK tape | 0.0075 | 0 |
| 8 | AS4D carbon/PEKK tape | 0.0075 | 90 |
| 9 | AS4D carbon/PEKK tape | 0.0075 | +45 |
| 10 | AS4D carbon/PEKK tape | 0.0075 | −45 |
| 11 | S-2 glass/PEKK fabric | 0.0035 | ±45 |
| Total | N/A | 0.0770 | N/A |

E-glass, S-glass, and/or S-2 glass fibers (e.g., 933 S-2 glass fibers), for example, for glass composite layers, may be commercially available, for example, from AGY of Aiken, South Carolina, under the trade name S-2 Glass®.

Carbon fibers (e.g., AS4D 4000 carbon fibers), for example, for carbon composite layers, may be commercially available, for example, from Hexcel Corporation of Stamford, Connecticut, under the trade name HexTow®.

Although examples have been shown and described in this specification and figures, it would be appreciated that changes may be made to the illustrated and/or described examples without departing from their principles and spirit, the scope of which is defined by the following claims and their equivalents.

What is claimed is:

1. A method of manufacturing a material system, the method comprising:
   laying up a first layer adjacent to a mold tool;
   laying up a second layer adjacent to the first layer;
   laying up a third layer adjacent to the second layer; and
   consolidating one or more thermoplastic prepreg plies of a glass composite layer and a carbon composite layer;
   wherein the first, second, and third layers form a stack,
   wherein the first layer comprises one of an aluminum layer and the carbon composite layer,
   wherein the third layer comprises the other one of the aluminum layer and the carbon composite layer,
   wherein the second layer comprises the glass composite layer and wherein the glass composite layer prevents interaction between the aluminum layer and the carbon composite layer,
   wherein the glass composite layer comprises glass fibers, but no carbon fibers,
   wherein the consolidating of the one or more thermoplastic prepreg plies of the glass composite layer and the carbon composite layer comprises:
     raising a temperature of the stack to greater than or equal to 700° F. and less than or equal to 720° F.;
     raising a pressure of the stack to greater than or equal to 95 pounds per square inch gage (psig) and less than or equal to 105 psig; and
     holding the temperature and pressure of the stack for greater than or equal to 5 minutes and less than or equal to 15 minutes, and
   wherein the consolidating of the one or more thermoplastic prepreg plies of the glass composite layer and the carbon composite layer comprises a heat-up phase wherein the pressure is low and the heat up rate is any value, a hold phase wherein the temperature is held substantially constant within 700° and 720° F. and the pressure is held substantially constant within 95 and 105 psig, and a cooldown phase wherein a temperature cooldown rate is limited and a pressure band is maintained until the temperature is significantly reduced.

2. The method of claim 1, wherein the first layer comprises the aluminum layer, and
wherein the third layer comprises the carbon composite layer.

3. The method of claim 2, wherein the temperature to which the stack is raised is sufficient to soften the aluminum layer for molding, shaping, and manufacturing of the material system.

4. The method of claim 1, wherein the first layer comprises the carbon composite layer, and
wherein the third layer comprises the aluminum layer.

5. The method of claim 4, wherein the temperature to which the stack is raised is sufficient to soften the aluminum layer for molding, shaping, and manufacturing of the material system.

6. The method of claim 1, wherein the consolidating of the one or more thermoplastic prepreg plies of the glass composite layer and the carbon composite layer comprises:
holding the temperature and pressure of the stack during the hold phase for greater than or equal to 5 minutes and less than or equal to 10 minutes.

7. A method of manufacturing a material system, the method comprising:
laying up a first layer adjacent to a mold tool;
laying up a second layer adjacent to the first layer;
laying up a third layer adjacent to the second layer;
laying up a fourth layer adjacent to the third layer; and
consolidating one or more thermoplastic prepreg plies of a first glass composite layer, a second glass composite layer, and a carbon composite layer;
wherein the first, second, third, and fourth layers form a stack,
wherein one of the first, second, third, and fourth layers comprises the carbon composite layer, and wherein another one of the first, second, third, and fourth layers comprises an aluminum layer,
wherein another one of the first, second, third, and fourth layers comprises the first glass composite layer,
wherein another one of the first, second, third, and fourth layers comprises the second glass composite layer,
wherein at least one of the first glass composite layer and the second glass composite layer prevents interaction between the aluminum layer and the carbon composite layer,
wherein the first glass composite layer comprises glass fibers, but no carbon fibers,
wherein the second glass composite layer comprises glass fibers, but no carbon fibers,
wherein the consolidating of the one or more thermoplastic prepreg plies of the first glass composite layer, the second glass composite layer, and the carbon composite layer comprises:
raising a temperature of the stack to greater than or equal to 700° F. and less than or equal to 720° F.;
raising a pressure of the stack to greater than or equal to 95 pounds per square inch gage (psig) and less than or equal to 105 psig; and
holding the temperature and pressure of the stack for greater than or equal to 5 minutes and less than or equal to 15 minutes, and
wherein the consolidating of the one or more thermoplastic prepreg plies of the first glass composite layer, the second glass composite layer, and the carbon composite layer comprises a heat-up phase wherein the pressure is low and the heat up rate is any value, a hold phase wherein the temperature is held substantially constant within 700° and 720° F. and the pressure is held substantially constant within 95 and 105 psig, and a cooldown phase wherein a temperature cooldown rate is limited and a pressure band is maintained until the temperature is significantly reduced.

8. The method of claim 7, wherein the first layer comprises the aluminum layer,
wherein the second layer comprises the first glass composite layer,
wherein the third layer comprises the carbon composite layer, and
wherein the fourth layer comprises the second glass composite layer.

9. The method of claim 8, wherein the temperature to which the stack is raised is sufficient to soften the aluminum layer for molding, shaping, and manufacturing of the material system.

10. The method of claim 7, wherein the first layer comprises the first glass composite layer,
wherein the second layer comprises the carbon composite layer,
wherein the third layer comprises the second glass composite layer, and
wherein the fourth layer comprises the aluminum layer.

11. The method of claim 10, wherein the temperature to which the stack is raised is sufficient to soften the aluminum layer for molding, shaping, and manufacturing of the material system.

12. The method of claim 7, wherein the consolidating of the one or more thermoplastic prepreg plies of the first glass composite layer, the second glass composite layer, and the carbon composite layer comprises:
holding the temperature and pressure of the stack during the hold phase for greater than or equal to 5 minutes and less than or equal to 10 minutes.

13. A method of manufacturing a material system, the method comprising:
laying up a first layer adjacent to a mold tool;
laying up a second layer adjacent to the first layer;
laying up a third layer adjacent to the second layer;
laying up a fourth layer adjacent to the third layer;
laying up a fifth layer adjacent to the fourth layer; and
consolidating one or more thermoplastic prepreg plies of a first glass composite layer, a second glass composite layer, and one or more carbon composite layers;
wherein the first, second, third, fourth, and fifth layers form a stack,
wherein at least one of the first, second, third, fourth, and fifth layers comprises the one or more carbon composite layers, and wherein at least one of the first, second, third, fourth, and fifth layers comprises one or more aluminum layers,
wherein one of the first, second, third, fourth, and fifth layers comprises the first glass composite layer,
wherein one of the first, second, third, fourth, and fifth layers comprises the second glass composite layer,
wherein at least one of the first glass composite layer and the second glass composite layer prevents interaction between the one or more aluminum layers and the one or more carbon composite layers,
wherein the first glass composite layer comprises glass fibers, but no carbon fibers,
wherein the second glass composite layer comprises glass fibers, but no carbon fibers, wherein the consolidating of the one or more thermoplastic prepreg plies of the first glass composite layer, the second glass composite layer, and the one or more carbon composite layers comprises:
  raising a temperature of the stack to greater than or equal to 700° F. and less than or equal to 720° F.;
  raising a pressure of the stack to greater than or equal to 95 pounds per square inch gage (psig) and less than or equal to 105 psig; and
  holding the temperature and pressure of the stack for greater than or equal to 5 minutes and less than or equal to 15 minutes, and
wherein the consolidating of the one or more thermoplastic prepreg plies of the first glass composite layer, the second glass composite layer, and the one or more carbon composite layers comprises a heat-up phase wherein the pressure is low and the heat up rate is any value, a hold phase wherein the temperature is held substantially constant within 700° and 720° F. and the pressure is held substantially constant within 95 and 105 psig, and a cooldown phase wherein a temperature cooldown rate is limited and a pressure band is maintained until the temperature is significantly reduced.

14. The method of claim 13, wherein the first layer comprises a first aluminum layer,
  wherein the second layer comprises the first glass composite layer,
  wherein the third layer comprises a first carbon composite layer,
  wherein the fourth layer comprises the second glass composite layer, and
  wherein the fifth layer comprises a second aluminum layer.

15. The method of claim 14, wherein the temperature to which the stack is raised is sufficient to soften the first aluminum layer, the second aluminum layer, or the first and second aluminum layers for molding, shaping, and manufacturing of the material system.

16. The method of claim 13, wherein the first layer comprises an aluminum layer,
  wherein the second layer comprises the first glass composite layer,
  wherein the third layer comprises a first carbon composite layer,
  wherein the fourth layer comprises the second glass composite layer, and
  wherein the fifth layer comprises a second carbon composite layer.

17. The method of claim 16, wherein the temperature to which the stack is raised is sufficient to soften the aluminum layer for molding, shaping, and manufacturing of the material system.

18. The method of claim 13, wherein the first layer comprises a first carbon composite layer,
  wherein the second layer comprises the first glass composite layer,
  wherein the third layer comprises a second carbon composite layer,
  wherein the fourth layer comprises the second glass composite layer, and
  wherein the fifth layer comprises an aluminum layer.

19. The method of claim 18, wherein the temperature to which the stack is raised is sufficient to soften the aluminum layer for molding, shaping, and manufacturing of the material system.

20. The method of claim 13, wherein the consolidating of the one or more thermoplastic prepreg plies of the first glass composite layer, the second glass composite layer, and the first carbon composite layer comprises:
  holding the temperature and pressure of the stack during the hold phase for greater than or equal to 5 minutes and less than or equal to 10 minutes.

* * * * *